United States Patent
Iwagami et al.

(10) Patent No.: US 7,912,600 B2
(45) Date of Patent: Mar. 22, 2011

(54) IN-VEHICLE ELECTRONIC CONTROL APPARATUS HAVING MONITORING CONTROL CIRCUIT

(75) Inventors: Yuki Iwagami, Chiyoda-ku (JP); Susumu Tanaka, Chiyoda-ku (JP); Shoso Tsunekazu, Chiyoda-ku (JP); Akihiro Ishii, Chiyoda-ku (JP); Koji Hashimoto, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 531 days.

(21) Appl. No.: 12/120,921

(22) Filed: May 15, 2008

(65) Prior Publication Data
US 2009/0134970 A1    May 28, 2009

(30) Foreign Application Priority Data
Nov. 26, 2007    (JP) .................. 2007-304813

(51) Int. Cl.
*G01M 17/00* (2006.01)
*F02D 45/00* (2006.01)
*G06F 11/30* (2006.01)

(52) U.S. Cl. ............... 701/29; 701/31; 701/33
(58) Field of Classification Search .......... 701/29, 701/31, 33, 35, 102; 340/3.2
See application file for complete search history.

(56) References Cited

U.S. PATENT DOCUMENTS
2008/0161989 A1 *  7/2008  Breed ................ 701/29

FOREIGN PATENT DOCUMENTS
| JP | 2001-350735 A | 12/2001 |
| JP | 2002108835 A | 4/2002 |
| JP | 2005-031865 A | 2/2005 |
| JP | 2005240631 A | 9/2005 |

* cited by examiner

*Primary Examiner* — Tan Q Nguyen
(74) *Attorney, Agent, or Firm* — Sughrue Mion, PLLC

(57) ABSTRACT

An in-vehicle electronic control apparatus, having a monitoring control circuit, according to the present invention is configured in such a way that serial interface circuits 27a and 37a are connected between a main control circuit unit 20A and a monitoring control circuit unit 30A, high-speed full-duplex block communication is performed by use of a communication permission signal ALT and a communication synchronization signal CLK, the same question information included in uplink communication information UPD is recurrently transmitted in a plurality times of communication and updated after being transmitted a predetermined times, and the main control circuit unit 20A returns answer information by use of downlink communication information DND, within a predetermined duration after the update of the question information; because the question update period is prolonged, the control load on the main control circuit unit 20A is reduced.

14 Claims, 14 Drawing Sheets

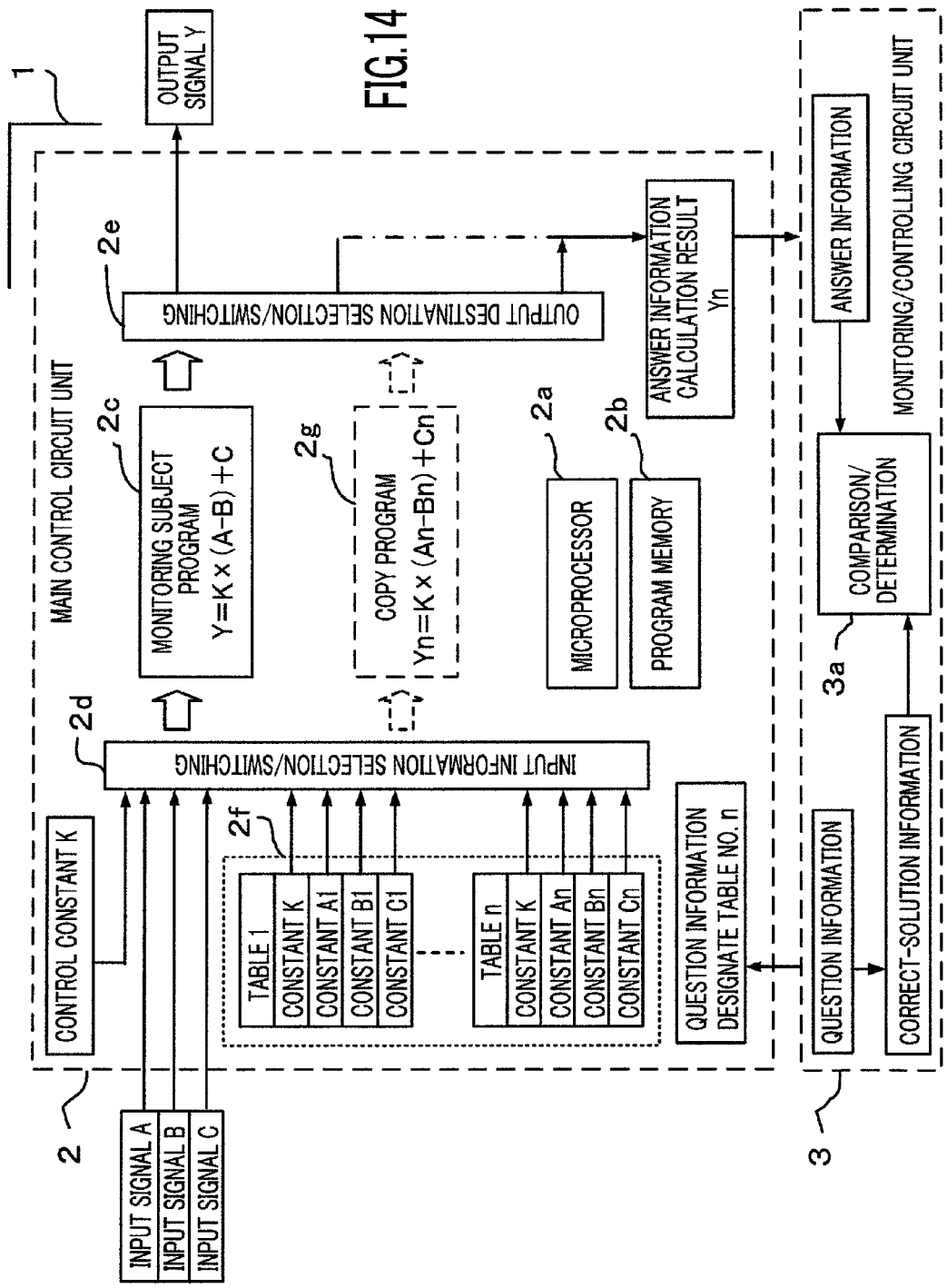

IN-VEHICLE ELECTRONIC CONTROL APPARATUS HAVING MONITORING CONTROL CIRCUIT

BACKGROUND OF THE INVENTION

1. Field of the Invention

The present invention relates to an in-vehicle electronic control apparatus incorporating a microprocessor and particularly to improvement of an in-vehicle electronic control apparatus, such as an engine control apparatus, which has a monitoring control circuit serially connected to the microprocessor in order to enhance the safety of the control.

2. Description of the Related Art

It is publicly known that, in an in-vehicle electronic control apparatus equipped with a microprocessor, a so-called Q&A-method abnormality determination unit is utilized in which, in order to always monitor whether or not the microprocessor functions normally, a monitoring control circuit unit is provided, the monitoring control circuit transmits question information to the microprocessor that serves as a main control circuit unit, the microprocessor sends the monitoring control circuit unit answer information in response to the question information, and then the monitoring control circuit compares the sent answer information with correct-solution information that has preliminarily been provided and ascertains whether or not a normal answer has been obtained.

For example, a mutual monitoring method among a plurality of data processing devices, which is a method for mutually monitoring whether or not a plurality of data processing devices functions normally, has already been proposed (e.g., refer to Japanese Patent Laid-Open No. 2001-350735); the mutual monitoring method is characterized in that a plurality of question codes is prepared; a first data processing device sends a second data processing device any one of the plurality of question codes; the second data processing device performs a predetermined calculation that has been preliminarily determined in accordance with the received question code and sends the actual calculation result to the first data processing device; and then the operations of the first and the second data processing device are monitored, based on the result of determination on whether or not the first data processing device has been able to receive the actual calculation result within a predetermined time period and the result of comparison between the content of the actual calculation result and a correct-solution calculation result that has been prepared in accordance with the received question code.

In the conventional method disclosed in Japanese Patent Laid-Open No. 2001-350735, the foregoing question code denotes a question number; letting N denote the question number, the calculation to be performed by the second data processing device is defined as $[N+2^5+2^7+2^9+(N*2^{10})+2^{14}+2^{15}]$. As described above, the calculated data includes N; the correct-solution information corresponding to the question number is preliminarily stored as known information in the first data processing device. The conventional apparatus disclosed in Japanese Patent Laid-Open No. 2001-350735 is configured in such a way that the value of an error counter is increased or decreased, depending on whether or not the actual calculation result has been obtained within the predetermined time period and whether or not the actual calculation result has been correct, and a predetermined command is outputted when the value of the error counter exceeds a predetermined value.

Moreover, as another conventional apparatus, an electronic control apparatus incorporating a microprocessor, which periodically and alternatively implements part of a control program so as to perform an operation inspection while the engine is running, has been disclosed (e.g., refer to Japanese Patent Laid-Open No. 2005-31865), in which a monitoring control circuit unit sequentially transmits, through an inquiry packet, a great number of question items to a microprocessor that controls a group of electric loads in response to the contents of a nonvolatile program memory and the operation status of a group of input sensors, and compares the content of the reply from the microprocessor with correct-solution information so as to perform an abnormality determination, and the microprocessor diagnoses the cycle of reception of the inquiry packets so as to counter-monitor the monitoring operation of the monitoring control circuit unit.

The outline of the Q&A-method abnormality determination unit set forth with regard to the conventional apparatus disclosed in Japanese Patent Laid-Open No. 2005-31865 is as illustrated in FIG. 14. In FIG. 14, an electronic control apparatus 1 is configured with a main control circuit unit 2 incorporating a microprocessor 2a and a monitoring control circuit unit 3 serially connected to the main control circuit unit 2. The main control circuit unit 2 is configured in such a way as to respond to the operation statuses of a great number of input signals including input signals A, B, and C and output a great number of output signals including an output signal Y so as to drive and control the electric loads; the main control circuit unit 2 is configured in such a way that the control specification thereof is determined by the contents of a program memory 2b that collaborates with the microprocessor 2a.

For example, a monitoring subject program 2c is configured in such a way as to calculate the output signal Y [=K×(A−B)+C], based on the input signals A, B, and C and a control constant K that is preliminarily stored in the program memory 2b. Simulated-calculation data 2f is stored in the program memory 2b; a table n that typifies data tables 1, 2, - - - , n in the simulated-calculation data 2f is configured with simulation constants An, Bn, and Cn corresponding to the control constant K and the input signals A, B, and C; however, the electronic control apparatus 1 is configured in such a way that the table to be utilized for the simulated calculation is randomly designated in an updating manner, in accordance with question information from the monitoring control circuit unit 3.

The electronic control apparatus 1 is configured in such a way that, for the monitoring subject program 2c, an input information switching unit 2d periodically designates the data table n instead of the input signal A, B, and C, and the calculation result Yn [=K×(An−Bn)+Cn] is periodically transmitted, as answer information, to the monitoring control circuit unit 3 by way of an output destination switching unit 2e. The electronic control apparatus 1 is configured in such a way that the correct-solution information corresponding to question information (a data table number for simulated calculation) is preliminarily stored in the monitoring control circuit unit 3, and an abnormality determination unit 3a compares the answer information obtained from the main control circuit unit 2 with the correct-solution information so as to determine whether or not an abnormality exists. In addition, as the control program for performing the simulated calculation utilizing the data table, the monitoring subject program 2c may directly be utilized, or a copy program 2g, which is the monitoring subject program 2c written in a different address region of the program memory 2b, may be utilized.

In the conventional mutual monitoring method disclosed in Japanese Patent Laid-Open No. 2001-350735, no method for data communication between the first and second processing devices is described. Moreover, the calculation equation for the simulated calculation is not related to input and output control; therefore, neither input and output control timing nor communication timing is taken into account. Still moreover, in the conventional electronic control apparatus disclosed in Japanese Patent Laid-Open No. 2005-31865, because, for the communication with the monitoring control circuit unit, start-stop synchronization method (asynchronous communication method) is adopted in which transmission and reception are performed in steps of several bits and input and output monitoring information and Q&A information are each transmitted and received in a divided manner at appropriate timings; therefore, the cycles of the transmission and reception of the input and output monitoring information and the cycles of the transmission and reception of the Q&A information can arbitrarily be changed. However, it has been a problem that, for the transmission data and the reception data, address information for designating the storage destination of the data and command information for discriminating the contents of the transmission data and the reception data are required, whereby the amounts of the transmission data and the reception data increase and the start-stop synchronization method is not suitable for high-speed communication.

SUMMARY OF THE INVENTION

The objective of the present invention is to provide an in-vehicle electronic control apparatus in which, in an in-vehicle electronic control apparatus provided with a monitoring control circuit unit that is serially connected to a main control circuit unit for dealing with input and output signals and periodically performing frequent operation and that performs not only a Q&A-method abnormality diagnosis but also communication, of part of input and output signals, in which no periodic frequent operation is performed, it is made possible to perform relatively frequently periodic communication of input and output monitoring information so that, when a change in the input and output signals exists, the change can rapidly be transferred and so that a calculation-control load on the main control circuit unit, which is caused by the Q&A information being transmitted and received in an excessively frequent manner, can be reduced.

An in-vehicle electronic control apparatus, having a monitoring control circuit, according to the present invention is provided with a main control circuit unit including a non-volatile program memory; a RAM memory for calculation processing; a first input interface circuit to which a first input sensor group incorporating opening and closing sensors that operate at a variable frequency is connected; a first output interface circuit to which a first electric load group incorporating loads that operate at a variable frequency is connected; and a microprocessor that controls the first electric load group, in response to contents of a control program stored in the non-volatile program memory and an operation status of the first input sensor group, and a monitoring control circuit unit including a question information generation unit that is connected to the microprocessor through a pair of serial interface circuits, that performs communication with regard to input and output signals, of the second input sensor group and the second electric load group, which are part of input and output signals for the microprocessor, and that periodically and sequentially transmits question information items to the main control circuit unit; a correct-information storage memory that stores correct information items for the question information items; and an abnormality determination unit that compares answer information, based on the question information, from the main control circuit unit with the correct information stored in the correct-information storage memory so as to determine whether or not an abnormality exists in the main control circuit unit.

The in-vehicle electronic control apparatus, having a monitoring control circuit, according to the present invention is characterized in that the serial interface circuits are connected between the main control circuit unit and the monitoring control circuit unit, and configure a full-duplex block communication circuit in which multi-byte downlink communication information and uplink communication information are simultaneously transmitted and received based on a communication permission signal and a communication synchronization signal; the monitoring control circuit unit is provided with a question information updating unit; the downlink communication information is transmitted through downlink communication from the main control circuit unit to the monitoring control circuit unit and includes a setting constant or a control output that is required by the monitoring control circuit unit, answer information for the question information obtained from the immediately previous uplink communication information, and code check information; the uplink communication information is transmitted through uplink communication from the monitoring control circuit unit to the main control circuit unit and includes input signal information for the monitoring control circuit unit or storage information for the setting constant or the control output obtained from the main control circuit unit, present question information, and code check information; the communication permission signal is a signal that is periodically transmitted, through an independent control signal line, from the main control circuit unit to the monitoring control circuit unit and with which the main control circuit unit permits the monitoring control circuit unit to start the full-duplex block communication; the communication synchronization signal is transmitted, through an independent control signal line, from the monitoring control circuit unit to the main control circuit unit or from the main control circuit unit to the monitoring control circuit unit and has a train of pulses whose number corresponds to at least the number of communication-information bits; the question information updating unit recurrently transmits question information included in the uplink communication information in such a way that the question information becomes the same in a plurality of times of communication and after transmitting of the question information for a predetermined duration, updates the question information; and the main control circuit unit generates answer information for the question information before the predetermined duration elapses from the update of the question information.

An in-vehicle electronic control apparatus according to the present invention is configured in such a way that a main control circuit unit and a monitoring control circuit unit, which are connected with each other by use of a full-duplex block communication circuit, are provided, and while performing variable-period input and output control operation, the main control circuit unit performs, with the monitoring control circuit unit, periodic communication of part of input and output signals and periodic communication of an abnormality monitoring signal which includes question information and answer information; therefore, the substantial period of the abnormality monitoring signal can be prolonged by use of a question information updating unit. Accordingly, an effect is demonstrated in which not only the microprocessor can perform relatively frequent communication of part of the input and output signals and constant- and low-frequency abnormality monitoring, but also the control load on the microprocessor due to excess-frequency abnormality monitoring control can be reduced.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 14 is a conceptual diagram illustrating the outline of the Q&A-method abnormality determination unit of a conventional apparatus.

DETAILED DESCRIPTION OF THE PREFERRED EMBODIMENTS

Embodiment 1

(1) Configuration of in-Vehicle Electronic Control Apparatus According to Embodiment 1

Figure 1:
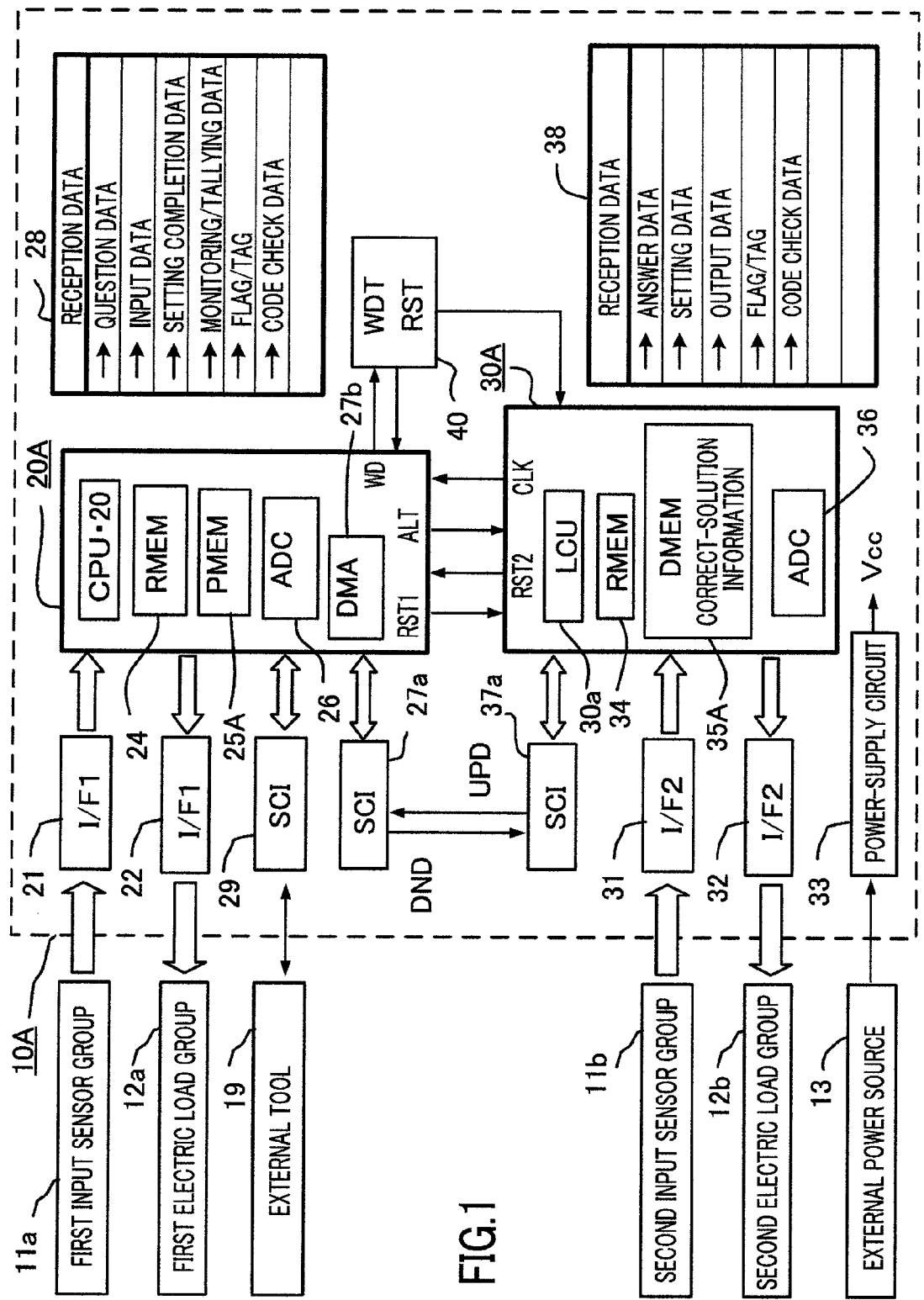
FIG. 1 is an overall block diagram illustrating an in-vehicle electronic control apparatus according to Embodiment 1 of the present invention.

In the first place, the configuration of an in-vehicle electronic control apparatus according to Embodiment 1 of the present invention will be explained in detail. FIG. 1 is an overall block diagram of an in-vehicle electronic control apparatus, having a monitoring control circuit, according to Embodiment 1 of the present invention. In FIG. 1, an in-vehicle electronic control apparatus 10A is provided with a main control circuit unit 20A that is formed mainly of a microprocessor 20 and a monitoring control circuit unit 30A that is formed mainly of a logic circuit unit 30a; the in-vehicle electronic control apparatus 10A is configured in such a way as to receive electric power from an external power source 13, which is an in-vehicle battery, so as to operate.

A first input sensor group 11a externally connected to the electronic control apparatus 10A is configured, for example, with high-speed on/off sensors, such as an engine rotation sensor and a crank angle sensor, which perform on/off operation in synchronization with the rotation of an engine, and analogue sensors for driving and controlling an engine, such as an accelerator position sensor for detecting an accelerator-pedal depressing level, a throttle position sensor for detecting an air-intake-throttle valve opening level, an airflow sensor for measuring an air intake amount for the engine, and an exhaust-gas sensor for detecting the oxygen concentration in an exhaust gas.

A first electric load group 12a that is driven by the electronic control apparatus 10A is configured, for example, with electric loads, such as a fuel-injection electromagnetic valve, an ignition coil (in the case of a gasoline engine), and a motor for controlling the valve opening level of an air-intake valve, which operate in conjunction with the rotation of the engine or directly relate to driving of the engine. A second input sensor group 11b is configured, for example, with operation switches such as a selection switch for the transmission shift lever, an accelerator pedal switch, and a brake pedal switch, or analogue sensors such as an engine-coolant-temperature sensor, a hydraulic pressure sensor, and an air pressure sensor.

A second electric load group 12b is configured with electric loads, which are auxiliary devices that do not relate to driving of an engine, such as a power supply relay for supplying loads with electric power, an electromagnetic clutch for driving an air conditioner, an electromagnetic valve for selecting a transmission stage, and an alarm/display device. An external tool 19 is connected through an unillustrated detachable/attachable connector to the electronic control apparatus 10A when the product is shipped or when maintenance and inspection is performed and communicates with the microprocessor 20 by the intermediary of a serial interface circuit 29, so that a control program and a control constant are transferred to and written in a program memory 25A described later.

Next, the internal configuration of the electronic control apparatus 10A will be explained. The main control circuit unit 20A is formed mainly of a 32-bit microprocessor 20; the microprocessor 20 is configured in such a way as to collaborate with the program memory 25A, which is a nonvolatile flash memory, and a RAM memory for calculation processing. The main control circuit unit 20A further includes a multichannel AD converter 26 for the analogue sensors in the first input sensor group and a serial-communication direct memory access controller (referred to as a DMA, hereinafter) 27b.

A first input interface circuit 21 is connected between the first input sensor group 11a and the microprocessor 20 and formed of a lowpass filter for converting the level of a signal voltage and suppressing signal noise. A first output interface circuit 22 is connected between the first electric load group 12a and an output port of the microprocessor 20 and formed of a power transistor for driving various kinds of electric loads. In addition, a communication control program, described later with reference to FIGS. 4 and 7, as well as an input and output control program is stored in the program memory 25A.

The monitoring control circuit unit 30A is formed mainly of the logic circuit unit 30a formed, for example, of a gate array; the logic circuit unit 30a is configured in such a way as to collaborate with a RAM memory 34 for calculation processing, a data memory 35A formed of a nonvolatile EEPROM memory or the like, and a multichannel AD converter 36 for the analogue sensors in the second input sensor group 11b.

A second input interface circuit 31 is connected between the second input sensor group 11b and an input port of the logic circuit unit 30a and formed of a low pass filter for converting the level of a signal voltage and suppressing signal noise. A second output interface circuit 32 is connected between the second electric load group 12b and an output port of the logic circuit unit 30a and formed of a power transistor for driving various kinds of electric loads. In addition, the logic circuit unit 30a is to perform, through hardware, communication control in accordance with a flowchart, described later with reference to FIGS. 5 and 6, in addition to communication control of input and output signals.

A power-supply circuit 33 is configured in such a way as to receive electric power from the external power source 13, to generate stabilized voltages such as DC 5[V], DC 3[V], and the like, and to supply electric power to the main control circuit unit 20A, the monitoring control circuit unit 30A, and input and output interface circuits.

The electronic control apparatus 10A is configured in such a way that serial interface circuits 27a and 37a, which are each formed of a pair of serial-parallel converters, configure a full-duplex block communication circuit, and downlink communication information DND transmitted from the main control circuit unit 20A to the monitoring control circuit unit 30A and uplink communication information UPD transmitted from the monitoring control circuit unit 30A to the main control circuit unit 20A can concurrently be transmitted and received. A communication permission signal ALT generated by the main control circuit unit 20A and a communication synchronization signal CLK generated by the monitoring control circuit unit 30A will be described later with reference to FIG. 2.

The direct memory access controller 27b is connected between the parallel input and output bus for the serial-parallel converter included in the serial interface circuit 27a and the data bus for the microprocessor 20, and transmits data to and receives data from a RAM memory 24 for calculation processing, without the intermediary of the microprocessor 20.

Uplink communication storage information 28 is reception data that is stored in the RAM memory 24 through uplink communication and includes Q&A question information, input signal information obtained from the second input sensor group 11b, setting completion information described later, monitoring/tallying information, flag/tag information, and code check information. Downlink communication storage information 38 is reception data that is stored in the RAM memory 34 through downlink communication and includes Q&A answer information, setting information, such as control constants, required by the monitoring control circuit unit 30A, output signal information for the second electric load group 12b, flag/tag information described later, and code check information.

In addition, the setting completion information in the uplink communication storage information 28 is information the same as either the setting information or the output signal information stored in the RAM memory 34; the electronic control apparatus 10A is configured in such a way that the main control circuit unit 20A can ascertain whether or not the setting information and the output signal information from the monitoring control circuit unit 30A have been transmitted correctly. The correct-solution information corresponding to question information is preliminarily stored in the data memory 35A of the monitoring control circuit unit 30A when the product is shipped; the logic circuit unit 30a randomly transmits question information items to the main control circuit unit 20A and compares answer information items returned by the microprocessor 20 with corresponding preliminarily stored correct-solution information items so as to monitor the operation status of the microprocessor 20. The electronic control apparatus 10A is configured in such a way that the microprocessor 20 in the main control circuit unit 20A sends an intentionally erroneous answer to the monitoring control circuit unit 30A and counter-monitors whether or not the monitoring control circuit unit 30A performs appropriate monitoring and controlling.

The electronic control apparatus 10A is configured in such a way that, as a result of the foregoing operation, when detecting an abnormality of the main control circuit unit 20A, the monitoring control circuit unit 30A initializes and restarts the main control circuit unit 20A by unit of a reset output RST2, and when detecting an abnormality of the monitoring control circuit unit 30A, the main control circuit unit 20A initializes and restarts the monitoring control circuit unit 30A by unit of a reset output RST1.

The watchdog timer 40 monitors a watchdog signal WD, which is a train of pulses generated by the microprocessor 20 in the main control circuit unit 20A; when the pulse width of the watchdog signal WD exceeds a predetermined value, the watchdog timer 40 generates a reset pulse RST so as to initialize and restart the main control circuit unit 20A and the monitoring control circuit unit 30A.

Additionally, the data memory 35A in which correct-solution information items are stored may be formed by a ROM memory, instead of an EEPROM, which is defined by a wiring pattern in the integrated circuit element that forms the monitoring control circuit unit 30A. In this case, a value, with which answer information that coincides with correct-solution information stored in a fixed manner can be obtained, is preliminarily calculated in a reverse manner, and then the reversely calculated value may be stored in the program memory 25A, as a real value in an input data table designated by question information.

Figure 2:
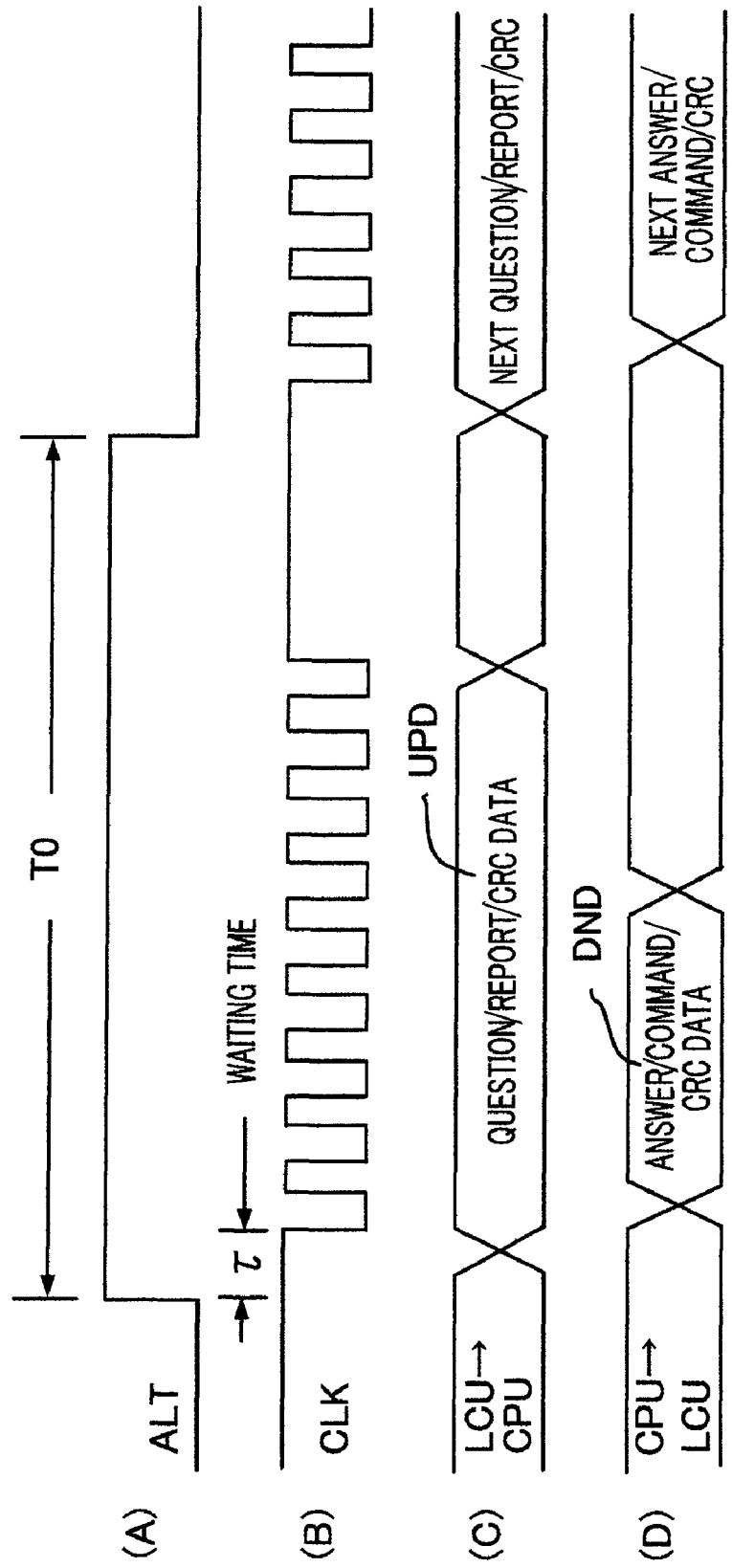
FIG. 2 is a timing chart for explaining serial communication in the in-vehicle electronic control apparatus according to Embodiment 1 of the present invention.

Next, serial communication in an in-vehicle electronic control apparatus according to Embodiment 1 of the present invention will be explained. FIG. 2 is a timing chart for explaining the serial communication. The communication permission signal ALT represented in FIG. 2(A) is a signal that is periodically transmitted, through an independent control signal line, from the main control circuit unit 20A to the monitoring control circuit unit 30A and with which the main control circuit unit 20A permits the start of full-duplex block communication. The communication permission signal ALT in Embodiment 1 is an alternate signal whose logic level changes at each communication permission timing.

Accordingly, each time the logic level of the alternate signal ALT changes, the transmission start of a new communication block is permitted; however, when a constant logic level is maintained, after communication of a predetermined bits is completed, the present communication ends, and when the logic level reverses before the completion of communication of the predetermined bits, interruption processing of communication data is performed.

The communication synchronization signal CLK represented in FIG. 2(B) is transmitted, through an independent control signal line, from the monitoring control circuit unit 30A to the main control circuit unit 20A and has a train of pulses whose number corresponds to at least the number of the communication-information bits. The communication synchronization signal CLK is a pulse train signal that starts to be generated after the elapse of a predetermined waiting time τ from the timing when the monitoring control circuit unit 30A has received the communication permission signal ALT; after the occurrence of the communication synchronization signal CLK, a serial communication signal starts to travel in a stepping manner.

The generation of pulses in the communication synchronization signal CLK is stopped after a train of pulses of a predetermined number corresponding to the number of transmission and reception bits has been generated, or the generation of pulses is continued even after a train of pulses of the predetermined number has been generated, the generation of pulses is temporarily stopped when the next communication permission signal ALT is generated, and then the generation of pulses is resumed after the elapse of the waiting time τ; in the case where the next communication permission signal ALT is generated before the predetermined number of pulses have been generated, the generation of the rest pulses is terminated and after the elapse of the waiting time τ, the generation of pulses is resumed.

The uplink communication information UPD represented in FIG. 2(C) includes input signal information for the monitoring control circuit unit 30A or report information which is the storage information for a setting constant or a control output obtained from the main control circuit unit 20A, present question information, and code check information; the data length thereof is, for example, 500 bits.

The downlink communication information DND represented in FIG. 2(D) includes command information, which is a setting constant or a control output that is transmitted from the main control circuit unit 20A to the monitoring control circuit unit 30A and required by the monitoring control circuit unit 30A, the answer information for question information obtained from the immediately previous uplink communication information UPD, and the code check information; the data length thereof is, for example, 100 bits.

Accordingly, in order to perform transmission and reception of all the data, it is required that the number of generated pulses in the communication synchronization signal CLK is at least 500. In addition, while the communication permission period T0 of the communication permission signal ALT is, for example, 5 [msec], the time required to transmit or receive 500-bit data is, for example, 0.5 [msec]. The waiting time τ is several hundreds of microseconds; during the waiting time τ, an AD conversion command for the multichannel AD converter 36 is generated, and AD conversions for all channels are completed.

Figure 3:
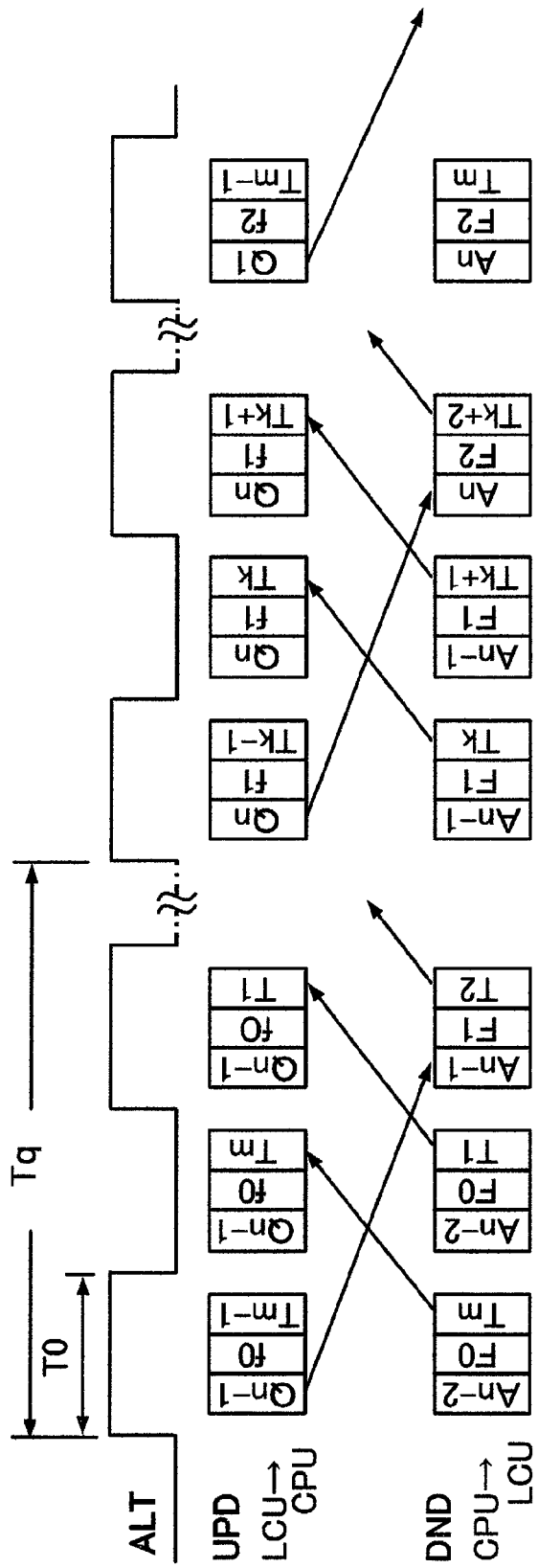
FIG. 3 is a transition view for explaining question information and answer information in the in-vehicle electronic control apparatus according to embodiment 1 of the present invention.

Next, question information and answer information in an in-vehicle electronic control apparatus, illustrated in FIG. 1, according to Embodiment 1 of the present invention will be explained. FIG. 3 is an explanatory view for explaining the transitions of question information and answer information. In FIG. 3, with regard to question information items Qn−1, Qn, Q1, - - - , which are included in the uplink communication information UPD, the same question information items are transmitted during a prolonged period (question update period) Tq (e.g., 40 [ms]) in which communication is permitted two or more times, through the communication permission signal ALT.

When the question information changes from Qn−1 to Qn, from Qn to Q1, and so forth, a first flag f consisting of two bits changes from 0 to 1, from 1 to 2, from 2 to 3, and so forth. With regard to answer information items An−2, An−1, An, - - - , which are included in the downlink communication information DND, FIG. 3 represents a situation in which, for example, in the second communication permission period T0 after the question information changes, the answer information of the same number as that of the question information can be obtained; however, in fact, the answer information An corresponding to the question information Qn is transmitted after an elapse time that is several times as long as the communication permission period T0. When the answer information changes from An−2 to An−1, from An−1 to An, and so forth, a second flag F consisting of two bits changes from 0 to 1, from 1 to 2, from 2 to 3, and so forth.

As a first tag T consisting of 8 bits, Tm, T1, T2, - - - , Tk, Tk+1, Tk+2, or so forth is added to the downlink communication information DND; a first tag information based on the first tag T is a serial number or a random number that is in a range from 0 to 255. For example, when, as the first tag Tm, numerical data "255" is added to the downlink communication information DND, the monitoring control circuit unit 30A receives that downlink communication information DND and then adds, as a second tag Tm, the same numerical data "255" to the next uplink communication information UPD.

In addition, the contents of the downlink communication information DND and the uplink communication information UPD do not change frequently; therefore, unless the first and second tag information items are added, the main control circuit unit 20A and the monitoring control circuit unit 30A each receive data having the same content upon each downlink communication, whereby it cannot be determined whether or not reception is appropriately performed. In contrast, when the first and second tag information items are added, not only reception of new data can be recognized because at least tag information in each reception data changes, but also the main control circuit unit 20A can recognize that the monitoring control circuit unit 30A receives appropriate data.

(2) Operation of in-Vehicle Electronic Control Apparatus According to Embodiment 1

Next, the operation of the in-vehicle electronic control apparatus according to Embodiment 1 of the present invention will be explained in detail. In FIG. 1, when the external power source 13 is connected through an unillustrated power switch to the electronic control apparatus 10A, the microprocessor 20 drives and controls the first electric load group 12a and the second electric load group 12b, based on the operation statuses of the first input sensor group 11a and the second input sensor group 11b and the contents of a control program in the program memory 25A.

In particular, the first input sensor group 11a and the first electric load group 12a perform open/close and on/off operations, in synchronization with the rotation of the engine. For example, in the case where a 4-cylinder and 4-cycle gasoline engine rotates at a rotation speed of 6000 [rpm], the ignition control and the fuel injection control are performed in steps of 5 [msec]; however, in the case where the rotation speed of the engine is 600 [rpm], the foregoing controls may be performed in steps of 50 [msec].

In contrast, because not performing operations in synchronization with the rotation of the engine, the second input sensor group 11b and the second electric load group 12b do not perform frequent operations; however, because, when the operation status changes, signal communication is required to be rapidly performed, it is desirable that communication with a constant period is relatively frequently performed regardless of the rotation speed of the engine.

Figure 4:
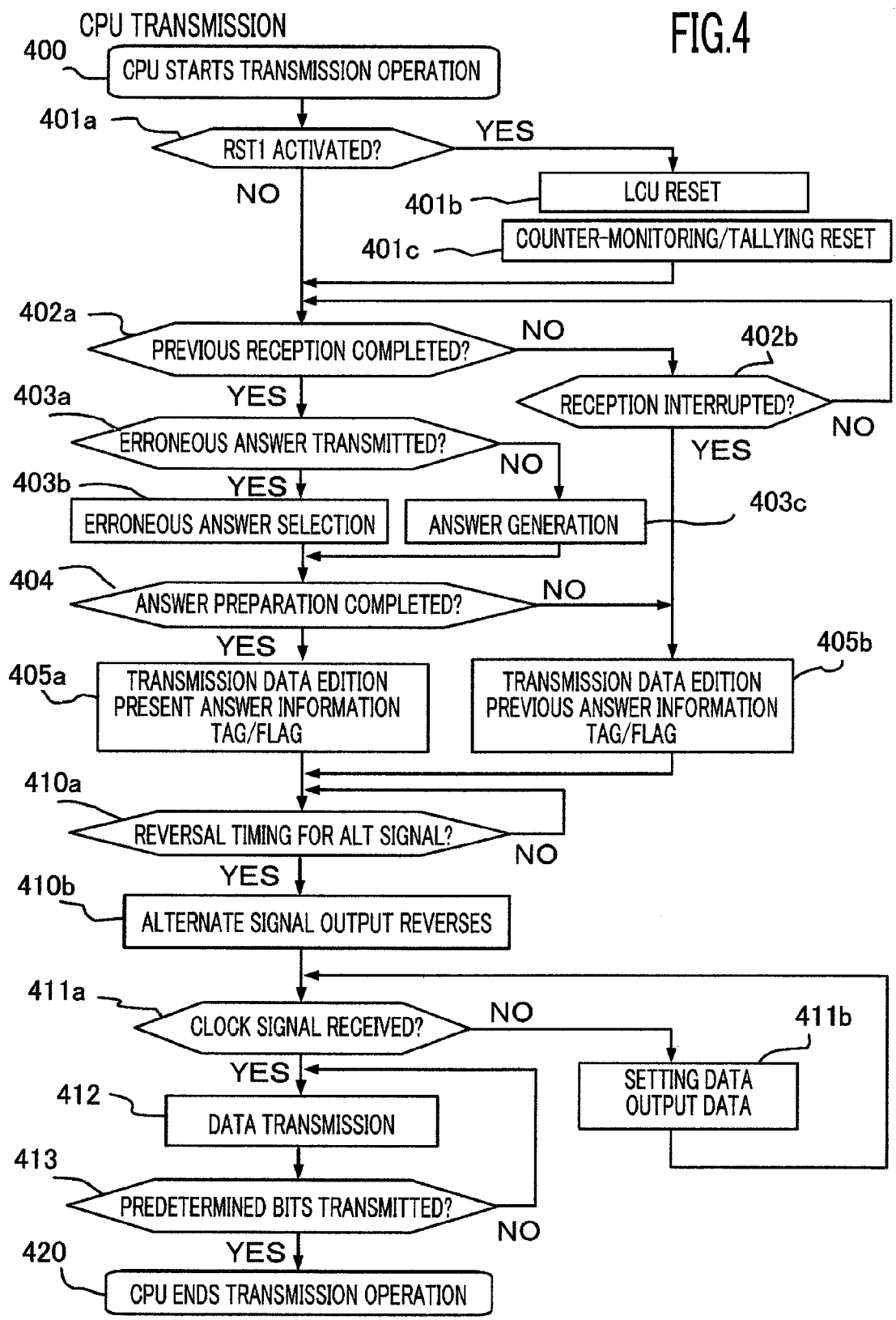
FIG. 4 is a flowchart for explaining the transmission operation of the main control circuit unit of the in-vehicle electronic control apparatus according to Embodiment 1 of the present invention.

Next, the transmission operation of the main control circuit unit 20A illustrated in FIG. 1 will be explained. FIG. 4 is a flowchart for explaining the transmission operation of the main control circuit unit 20A. In FIG. 4, the step 400 is a step in which the microprocessor 20 starts its transmission operation for the monitoring control circuit unit 30A. In the step 401a, it is determined whether or not the reset output RST1 has been generated in the step 719 (refer to FIG. 7) described later; in the case where the reset output signal RST1, which is a pulse signal, has been generated, a determination "YES" is made and the step 401a is followed by the step 401b, and in the case where the reset output signal RST1 has not been generated, a determination "NO" is made and the step 401a is followed by the step 402a.

In the step 401b, the monitoring control circuit unit 30A is initialized to be restarted; in the step 401c, by resetting the result of tallying, performed in the step 719 described later, of abnormalities in counter-monitoring, the reset output signal RST1 is halted, and the step 401c is followed by the step 402a. In the step 402a, it is determined whether or not the immediately previous reception has been completed in the step 712; in the case where the immediately previous reception has not been completed, a determination "NO" is made and the step 402a is followed by the step 402b, and in the case where the immediately previous reception has been completed, a determination "YES" is made and the step 402a is followed by the step 403a.

In the step 402b, it is determined whether or not the reception is to be interrupted; in the case where the reception is not to be interrupted, a determination "NO" is made and the step 402a is resumed, and in the case where the reception is to be interrupted, a determination "YES" is made and the step 402b is followed by the step 405b. In the step 403a, it is determined whether or not the present timing is a timing for transmitting an intentionally erroneous answer; in the case where the present timing is a timing for transmitting an intentionally erroneous answer, a determination "YES" is made and the step 403a is followed by the step 403b, and in the case where the present timing is not a timing for transmitting an intentionally erroneous answer, a determination "NO" is made and the step 403a is followed by the step 403c.

In addition, in the step 403a, a single determination "YES" is made for a plurality of updating question information items; however, in the case where the result of tallying, performed in the step 519 (refer to FIG. 5) described later, of abnormalities in counter-monitoring suggests that the reset pulse RST2 is about to be generated, a determination "NO" is made so that an erroneous-answer transmission does not cause the reset pulse RST2 to occur.

In the step 403b corresponding to an erroneous-answer transmission unit, as the present answer information, an intentionally erroneous answer is selectively determined; in the step 403c, the answer information for already received question information is continued to be generated. In the step 404, which is carried out after the step 403b or the step 403c, it is determined whether or not the answer generation in the step 403c has been completed or whether or not the erroneous-answer selection in the step 403b has been determined; in the case where the answer generation or the erroneous-answer selection has been completed, a determination "YES" is made and the step 404 is followed by the step 405a, and in the case where the answer generation or the erroneous-answer selection has not been completed, a determination "NO" is made and the step 404 is followed by the step 405b.

In the step 405a, not only the present answer information is determined, but also the respective contents of the first tag information and the second flag information are updated. In the step 405b, as the present answer information, the previous answer information is directly utilized, and the first tag information T is updated; however, the second flag information F is determined without being updated.

Next, in the step 410a, which is a waiting step and carried out after the step 405a or the step 405, it is determined whether or not the present timing is a timing for reversing the logic of the communication permission signal ALT, which is an alternate signal; in the case where the present timing is a timing for the reversal, a determination "YES" is made and the step 410a is followed by the step 410b, and in the case where the present timing is not a timing for the reversal, a determination "NO" is made and the step 410a is resumed. In addition, in the step 410a, the reversal operation is carried out, for example, in steps of 5 [msec]; however, the microprocessor 20 performs interrupting control operation for input and output control, so that the period of the reversal operation changes.

Next, in the step 410b, the logic level of communication permission signal ALT is reversed; after that the step 410b is followed by the step 411a. In the step 411a, it is determined whether or not the communication synchronization signal CLK generated by the monitoring control circuit unit 30A has been received; in the case where the communication synchronization signal CLK has not been received, a determination "NO" is made and the step 411a is followed by the step 411b, and in the case where the communication synchronization signal CLK has been received, a determination "YES" is made and the step 411a is followed by the step 412. In the step 411b, setting data and output signal data to be transmitted to the monitoring control circuit unit 30A is edited; after that, the step 411a is resumed within the waiting time τ represented in FIG. 2.

In the step 412, while collaborating with the DMA 27b, the microprocessor 20 sequentially transfers, for example, in steps of 8 bits, transmission data in the downlink communication information DND from the RAM memory 24 to the serial interface circuit 27a. In the step 413, an unillustrated clock counter counts the number of occurrences of the communication synchronization signal CLK so that it is determined whether or not a predetermined number of bits have been transmitted; in the case where the predetermined number of bits have not been transmitted, a determination "NO" is made and the step 412 is resumed, and in the case where the predetermined number of bits have been transmitted, a determination "YES" is made and the step 413 is followed by the step 420, which is an operation end step.

In the step 412, respective code check information items, as final information items, are added to all of the transmitted data items so that, by use of code check unit exemplified by the CRC check or the sum check, the occurrence of the intrusion of bit information (the logic "0" is erroneously replaced by the logic "1") or the loss of bit information (the logic "1" is erroneously replaced by the logic "0") is detected at the receiving side. In the operation end step 420, other control operations are performed; after that, the step 420 is circularly followed by the operation start step 400 within a predetermined time.

Figure 5:
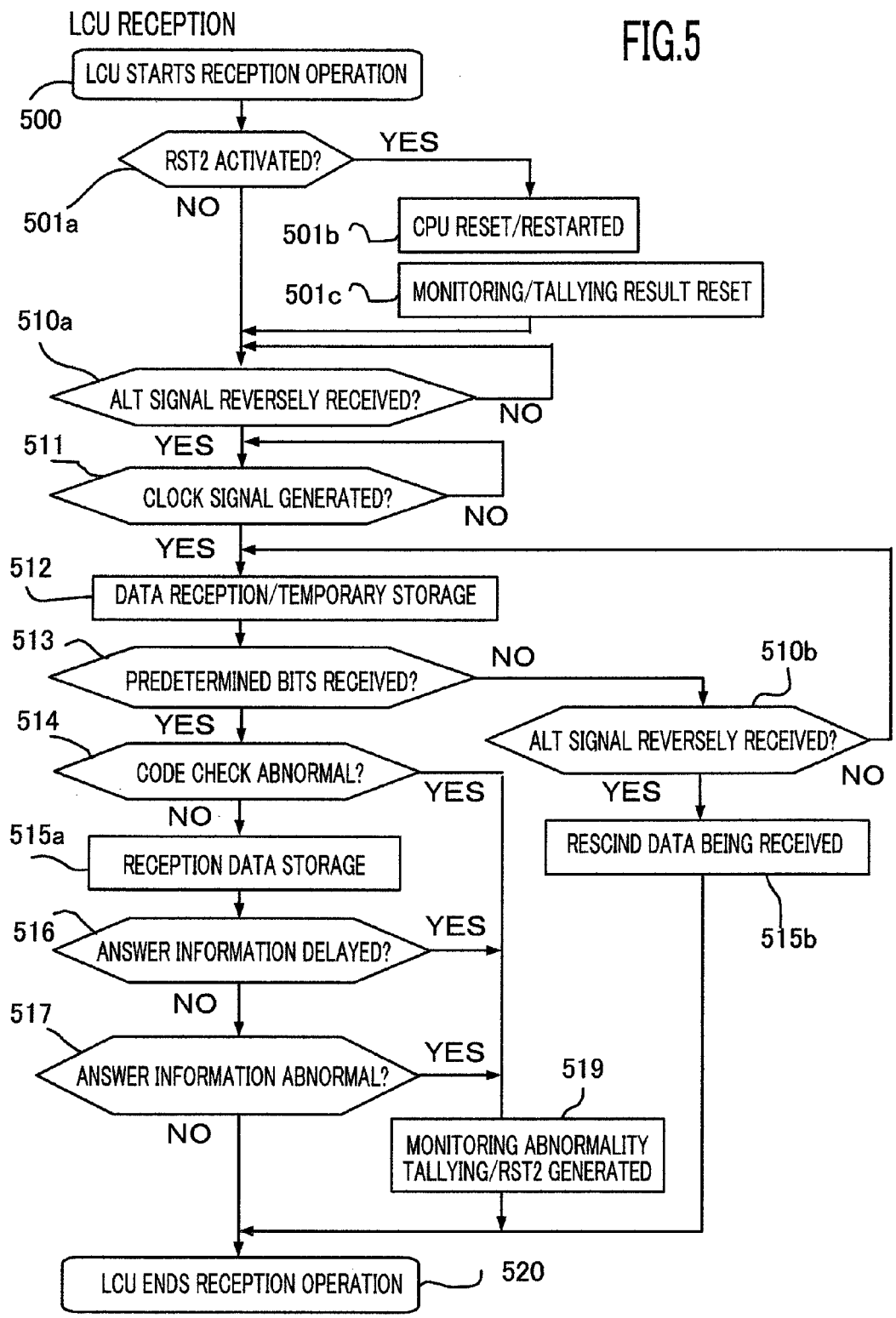
FIG. 5 is a flowchart for explaining the reception operation of the monitoring control circuit unit of the in-vehicle electronic control apparatus according to Embodiment 1 of the present invention.

Next, the reception operation of the monitoring control circuit unit 30A illustrated in FIG. 1 will be explained. FIG. 5 is a flowchart for explaining the reception operation of the monitoring control circuit unit 30A. In FIG. 5, in the step 500, reception logic operation of the logic-circuit unit 30a in the monitoring control circuit unit 30A is started. In the step 501a, it is determined whether or not the reset output signal RST2, which is a pulse signal, has been generated in the step 519 described later; in the case where the reset output signal RST2 has been generated, a determination "YES" is made and the step 501a is followed by the step 501b, and in the case where the reset output signal RST2 has not been generated, a determination "NO" is made and the step 501a is followed by the step 510a.

In the step 501b, the microprocessor 20 is initialized to restart; in the step 501c, by resetting the result of tallying, performed in the step 519 described later, of abnormalities in counter-monitoring, the reset output signal RST2 is halted, and the step 501c is followed by the step 510a. In the step 510a, which is a waiting step, it is determined whether or not the communication permission signal ALT, which is an alternate signal transmitted from the main control circuit unit 20A, has logically reversed; in the case where the communication permission signal ALT has logically reversed, a determination "YES" is made and the step 510a is followed by the step 511, and in the case where the communication permission signal ALT has not logically reversed, a determination "NO" is made and the step 510a is resumed.

In the step 511, which is a waiting step, it is determined whether or not the generation of the communication synchronization signal CLK has been started in the step 611c (refer to FIG. 6) described later; in the case where the generation of the communication synchronization signal CLK has been started, a determination "YES" is made and the step 511 is followed by the step 512, and in the case where the generation of the communication synchronization signal CLK has not been started and the present timing is within the waiting time τ, a determination "NO" is made and the step 511 is resumed. In the step 512, transmission data in the downlink communication information DND is sequentially transferred, for example, in steps of 8 bits, from the serial interface circuit 37a to the RAM memory 34 and temporarily stored therein.

In the step 513, an unillustrated clock counter counts the number of occurrences of the communication synchronization signal CLK so that it is determined whether or not a predetermined number of bits have been received; in the case where the reception has not been completed, a determination "NO" is made and the step 513 is followed by the step 510b, and in the case where the reception has been completed, a determination "YES" is made and the step 513 is followed by the step 514. In the step 510b, it is determined whether or not the communication permission signal ALT has logically reversed; in the case where the communication permission signal ALT has not logically reversed, a determination "NO" is made and the step 512 is resumed so that the reception operation is continued, and in the case where the communication permission signal ALT has logically reversed, a determination "YES" is made and the step 510b is followed by the step 515b.

In the step 514 corresponding to a code error detection unit, by use of the code check information added in the step 412, it is checked by the CRC check or the sum check whether or not an abnormality such as the intrusion of bit information or the loss of bit information has been caused in the received downlink communication information DND; in the case where an abnormality has been caused, a determination "YES" is made and the step 514 is followed by the step 519, and in the case where no abnormality has been detected, a determination "NO" is made and the step 514 is followed by the step 515a. In the step 515a, the reception data, which, in the step 512, has temporarily been stored, is stored as effective data; after the effective data is transferred as setting information and output signal information, the 515a is followed by the step 516. In contrast, in the step 515b corresponding to an interrupted information processing unit, the reception data that has temporarily been stored in the step 512 is rescinded; after that, the step 515b is followed by the step 520, which is an operation end step.

In the step 516 corresponding to a response delay determination unit, it is determined whether or not the answer information corresponding to question information has been received and stored in the step 515a, within a predetermined time after the question information has been updated in the step 605 (refer to FIG. 6) described later, i.e., whether or not the reception and storage of the answer information has been delayed; in the case where the reception and storage of the answer information has been delayed, a determination "YES" is made and the step 516 is followed by the step 519, and in the case where the reception and storage of the answer information has not been delayed, a determination "NO" is made and the step 516 is followed by the step 517.

In the step 517 corresponding to an abnormality determination unit, it is determined whether or not the answer information that has been stored in the step 515a coincides with correct-solution information preliminarily stored in the data memory 35A; in the case where the answer information does not coincide with the correct-solution information, a determination "YES" is made and the step 517 is followed by the step 519, and in the case where the answer information coincides with the correct-solution information, a determination "NO" is made and the step 517 is followed by the step 520.

In the step 519 corresponding to a reset processing unit that is formed of an unillustrated error counter, each time an abnormality determination "YES" is made in the step 514, 516, or 517, the present counter value of the error counter increases, for example, by five, and each time a normality determination "NO" is made in the step 514, 516, or 517, the present counter value of the error counter decreases, for example, by one, so that subtraction restriction is provided in order to prevent the present counter value of the error counter from becoming equal to or smaller than zero. The present counter value of the error counter formed as described above indicates the result of the tallying in monitoring; when the result of the monitoring/tallying exceeds, for example, 11, the reset output signal RST2 is generated. In the operation end step 520 that follows the step 519, other controls are performed, and then the operation start step 500 is resumed.

Figure 6:
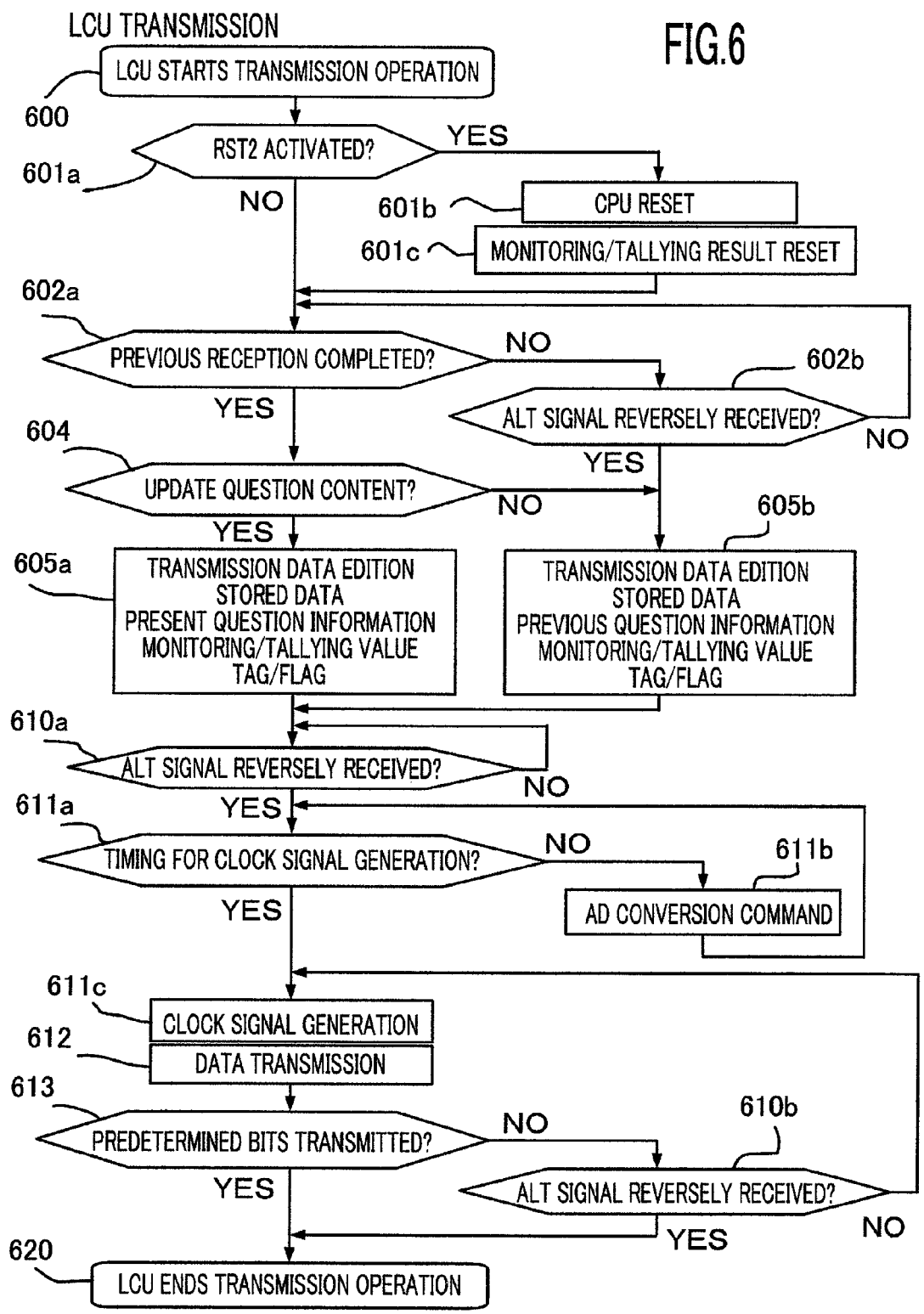
FIG. 6 is a flowchart for explaining the transmission operation of the monitoring control circuit unit of the in-vehicle electronic control apparatus according to Embodiment 1 of the present invention.

Next, the transmission operation of the monitoring control circuit unit 30A illustrated in FIG. 1 will be explained. FIG. 6 is a flowchart for explaining the transmission operation of the monitoring control circuit unit 30A. In FIG. 6, the step 600 is an operation start step in the case where the transmission logic operation of the logic circuit unit 30a in the monitoring control circuit unit 30A is represented with a flowchart. In the step 601a, it is determined whether or not the reset output signal RST2 has been generated in the step 519 described above; in the case where the reset output signal RST2 has been generated, a determination "YES" is made and the step 601a is followed by the step 601b, and in the case where the reset output signal RST2 has not been generated, a determination "NO" is made and the step 601a is followed by the step 602a.

In the step 601b, the microprocessor 20 is initialized to restart; in the step 601c, by resetting the result of tallying, performed in the step 519 described above, of abnormalities in counter-monitoring, the reset output signal RST2 is halted, and the step 601c is followed by the step 602a.

In the step 602a, it is determined whether or not the immediately previous reception has been completed in the step 512; in the case where the immediately previous reception has not been completed, a determination "NO" is made and the step 602a is followed by the step 602b, and in the case where the immediately previous reception has been completed, a determination "YES" is made and the step 602a is followed by the step 604. In the step 602b, it is determined whether or not the communication permission signal ALT has logically reversed; in the case where the communication permission signal ALT has not logically reversed, a determination "NO" is made and the step 602a is resumed so that the reception operation is continued; in the case where the communication permission signal ALT has logically reversed, a determination "YES" is made and the step 602b is followed by the step 605b.

In the step 604 corresponding to a question information updating unit, it is determined whether or not the present timing is a timing for updating the contents of a question information; in the case where the present timing is a timing for updating the question information, a determination "YES" is made and the step 604 is followed by the step 605a, and in the case where the present timing is not a timing for updating the question information, a determination "NO" is made and the step 604 is followed by the step 605b. In the step 604, a determination "YES" is made in steps of a question updating period Tq, for example, of 40 [msec].

In the step 605a corresponding to a question information generation unit, as the present transmission information, the respective contents of storage information items such as setting information and output signal information that have been determined and stored in the step 515a described above, the present updated question information, a tallied number of abnormalities in monitoring, tallied in the step 519 described above, second tag information, which is numerical data as is the case with the first tag information that has been determined and stored in the step 515a, and first flag information that is changed to a value different from the previous value are edited to be in predetermined transmission order.

In the step 605b, as the present transmission information, the respective contents of storage information items such as setting information and output signal information that have been determined and stored in the step 515a described above, the immediately previous question information, a tallied number of abnormalities in monitoring, tallied in the step 519 described above, second tag information, which is numerical data as is the case with the first tag information that has been determined and stored in the step 515a, and first flag information that is the same as the immediately previous one are edited to be in predetermined transmission order.

In the step 610a that is carried out after the step 605a or the step 605b, it is determined whether or not the communication permission signal ALT has logically reversed; in the case where the communication permission signal ALT has not logically reversed, a determination "NO" is made, the step 610a is resumed, and the transmission is suspended; in the case where the communication permission signal ALT has logically reversed, a determination "YES" is made and the step 610a is followed by the step 611a. In the step 611a, it is determined whether or not the present timing is a timing for generating the communication synchronization signal CLK; in the case where the predetermined waiting time τ has not elapsed after the reversal, in the step 610a, of the logic of the communication permission signal ALT, a determination "NO" is made and the step 611a is followed by the step 611b, and in the case where the predetermined waiting time τ has elapsed, a determination "YES" is made and the step 611a is followed by the step 611c.

In the step 611b, the AD conversion command is issued to the multichannel AD converter 36, the obtained latest AD conversion information is started to be edited as input data to be transmitted to the main control circuit unit 20A; after that, the step 611a is resumed within the waiting time τ represented in FIG. 2. In addition, the waiting time τ ends at the timing of the reception of an AD conversion completion signal from the multichannel AD converter 36, at the timing when the time required for all-channel AD conversion has elapsed, or after such a delay time as the AD conversion has been completed before the transmission of the AD converted input signals is started; after that the step 611a is followed by the step 611c, where the monitoring control circuit unit 30A starts to generate the communication synchronization signal CLK.

In the step 611c, the generation of the communication synchronization signal CLK is started; in the step 612, transmission data in the uplink communication information UPD is sequentially transferred from the RAM memory 34 to the serial interface circuit 37a. In the step 613, an unillustrated clock counter counts the number of occurrences of the communication synchronization signal CLK so that it is determined whether or not a predetermined number of bits have been transmitted; in the case where the predetermined number of bits have not been transmitted, a determination "NO" is made and the step 613 is followed by the step 610b, and in the case where the predetermined number of bits have been transmitted, a determination "YES" is made and the step 613 is followed by the step 620.

In the step 610b, it is determined whether or not the alternate signal ALT has logically reversed; in the case where the alternate signal ALT has not logically reversed, a determination "NO" is made and the step 611c is resumed so that the transmission is continued; in the case where the alternate signal ALT has logically reversed, a determination "YES" is made and the step 610b is followed by the operation end step 620, where the transmission is interrupted. Additionally, in the step 612, respective code check information items, as final information items, are added to all of the transmitted data items so that, by use of a code check unit exemplified by the CRC check or the sum check, the occurrence of the intrusion of bit information (the logic "0" is erroneously replaced by the logic "1") or the loss of bit information (the logic "1" is erroneously replaced by the logic "0") is detected at the receiving side. In the operation end step 620, other control operations are performed; after that, the step 620 is circularly followed by the operation start step 600 within a predetermined time.

Figure 7:
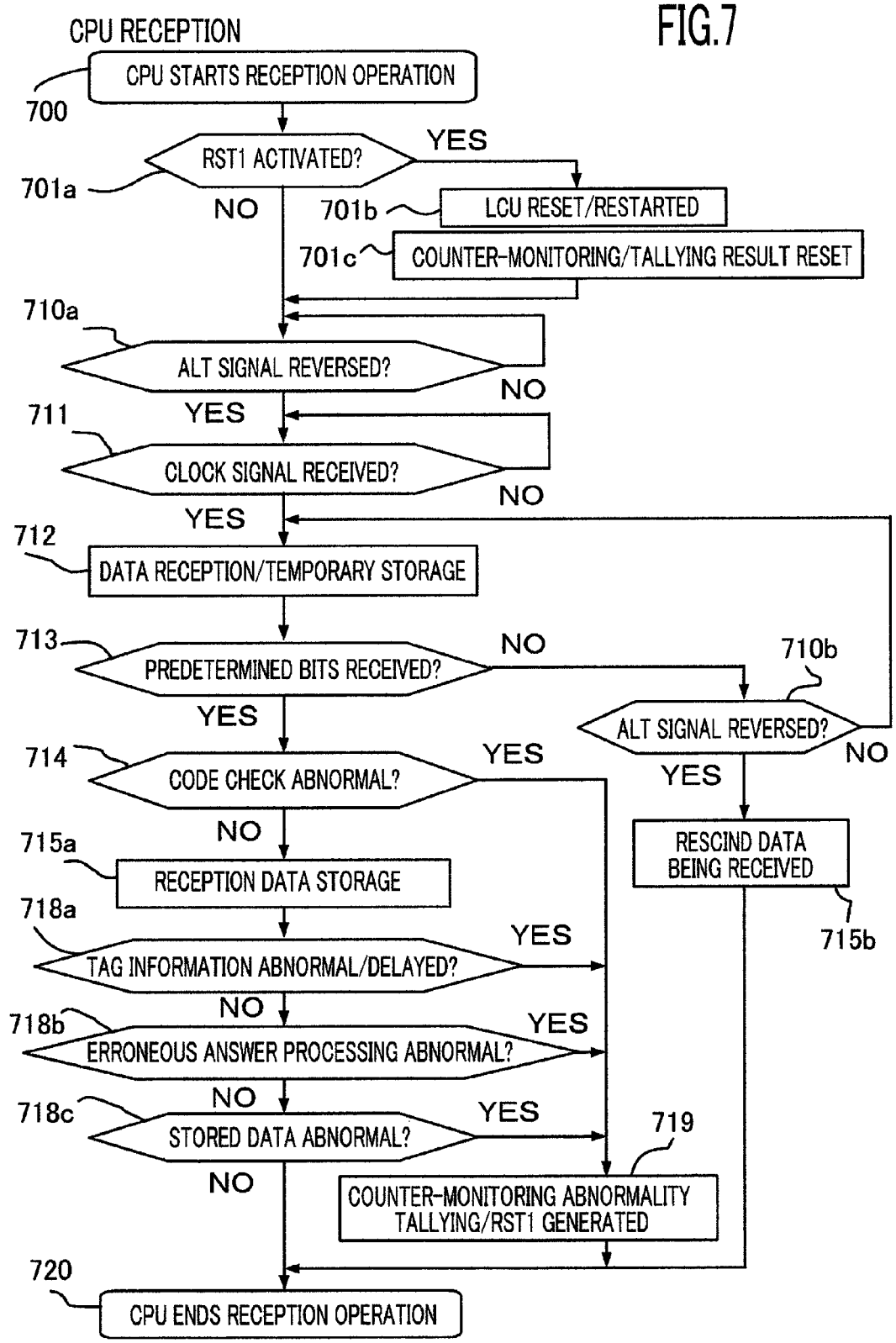
FIG. 7 is a flowchart for explaining the reception operation of the main control circuit unit of the in-vehicle electronic control apparatus according to Embodiment 1 of the present invention.

Next, the reception operation of the main control circuit unit 20A illustrated in FIG. 1 will be explained. FIG. 7 is a flowchart for explaining the reception operation of the main control circuit unit 20A. In FIG. 7, the step 700 is a step in which the microprocessor 20 starts its operation of receiving information from the monitoring control circuit unit 30A. In the step 701a, it is determined whether or not the reset output signal RST1 has been generated in the step 719 described later; in the case where the reset output signal RST1 has been generated, a determination "YES" is made and the step 701a is followed by the step 701b, and in the case where the reset output signal RST1 has not been generated, a determination "NO" is made and the step 701a is followed by the step 710a.

In the step 701b, the monitoring control circuit unit 30A is initialized to be restarted; in the step 701c, by resetting the result of tallying, performed in the step 719 described later, of abnormalities in counter-monitoring, the reset output signal RST1 is halted, and the step 701c is followed by the step 710a. In the step 710a, which is a waiting step, it is determined whether or not the communication permission signal ALT has logically reversed in the step 410b described above; in the case where the communication permission signal ALT has logically reversed, a determination "YES" is made and the step 710a is followed by the step 711, and in the case where the communication permission signal ALT has not logically reversed, a determination "NO" is made and the step 710a is resumed.

In the step 711, which is a waiting step, it is determined whether or not the generation of the communication synchronization signal CLK has been started in the step 611c described above; in the case where the generation of the communication synchronization signal CLK has been started, a determination "YES" is made and the step 711 is followed by the step 712, and in the case where the generation of the communication synchronization signal CLK has not been started and the present timing is within the waiting time τ, a determination "NO" is made and the step 711 is resumed. In the step 712, while collaborating with the DMA 27b, the microprocessor 20 sequentially transfers, for example, in steps of 8 bits, reception data in the uplink communication information UPD from the serial interface circuit 27a to the RAM memory 24 and temporarily stores the reception data in the RAM memory 24.

In the step 713, an unillustrated clock counter counts the number of occurrences of the communication synchronization signal CLK so that it is determined whether or not a predetermined number of bits have been received; in the case where the predetermined number of bits have not been received, a determination "NO" is made and the step 713 is followed by the step 710b, and in the case where the predetermined number of bits have been received, a determination "YES" is made and the step 713 is followed by the step 714. In the step 710b, it is determined whether or not the communication permission signal ALT has logically reversed; in the case where the communication permission signal ALT has not logically reversed, a determination "NO" is made and the step 712 is resumed so that the reception operation is continued, and in the case where the communication permission signal ALT has logically reversed, a determination "YES" is made and the step 710b is followed by the step 715b.

In the step 714 corresponding to a code error detection unit, by use of the code check information added in the step 612, it is checked by the CRC check or the sum check whether or not an abnormality such as the intrusion of bit information or the loss of bit information has been caused in the received uplink communication information UPD; in the case where an abnormality has been caused, a determination "YES" is made and the step 714 is followed by the step 719, and in the case where no abnormality has been detected, a determination "NO" is made and the step 714 is followed by the step 715a.

In the step 715a, the reception data that has temporarily been stored in the step 712 is stored as effective data and made to be new input signal information; after that, the step 715a is followed by the step 718a. In contrast, in the step 715b corresponding to an interrupted information processing unit, the reception data that has temporarily been stored in the step 712 is rescinded; after that, the step 715b is followed by the step 720, which is an operation end step.

The step 718a corresponding to a tag abnormality determination unit is a counter-monitoring unit in which it is determined whether or not the second tag information that has been received in the step 715a and the first tag information that has been transmitted in the step 412 described above coincide with each other, and in the case where the foregoing tag information items do not coincide with each other, or in the case where the second tag information, which coincides with the first tag information, is not obtained within a predetermined time, it is determined that an abnormality exists in the monitoring control circuit unit 30A; in the case where it is determined that an abnormality exists in the monitoring control circuit unit 30A, a determination "YES" is made and the step 718a is followed by the step 719, and in the case where no abnormality exists in the monitoring control circuit unit 30A, a determination "NO" is made and the step 718a is followed by the step 718b.

The step 718b corresponding to a tallied information monitoring unit is a step in which, by, in response to the erroneous-answer information that has been transmitted in the step 412 described above, monitoring the change in the result, of tallying in monitoring, which has been received in the step 715a, it is counter-monitored that the monitoring control circuit unit 30A normally operates; in the case where it is determined that an abnormality exists in the monitoring control circuit unit 30A, a determination "YES" is made and the step 718b is followed by the step 719, and in the case where it is determined that no abnormality exists in the monitoring control circuit unit 30A, a determination "NO" is made and the step 718b is followed by the step 718c.

The step 718c corresponding to a stored-information abnormality determination unit is a step in which the storage state of the setting information and the output information that have been received and stored, as part of the downlink communication information DND, by the monitoring control circuit unit 30A in the step 515a and the acknowledgement information that has been received, as part of the uplink communication information UPD, by the main control circuit unit 20A in the step 715 are compared so that whether or not an abnormality exists is determined; in the case where it is determined that an abnormality exists, a determination "YES" is made and the step 718c is followed by the step 719, and in the case where no abnormality exists, a determination "NO" is made and the step 718c is followed by the step 720. In addition, in order to determine whether or not an abnormality exists in the storage information, it is required to store the immediately previous setting information and output transmission information in the main control circuit unit 20A; therefore, in the step 718c, the coincidence determination is performed only with regard to part of important information items.

In the step 719 corresponding to a reset processing unit that is formed of an unillustrated error counter, each time an abnormality determination "YES" is made in the step 714, 718a, 718b, or 718b, the present counter value of the error counter increases, for example, by five, and each time a normality determination "NO" is made in the step 714, 718a, 718b, or 718c, the present counter value of the error counter decreases, for example, by one, so that subtraction restriction is provided in order to prevent the present counter value of the error counter from becoming equal to or smaller than zero. The present counter value of the error counter formed as described above indicates the result of the tallying in counter-monitoring; when the result of the tallying in counter-monitoring exceeds, for example, 11, the reset output signal RST1 is generated.

In the operation end step 720 that follows the step 719, other controls are performed, and then the operation start step 700 is resumed.

(3) Gist and Features of in-Vehicle Electronic Control Apparatus According to Embodiment 1

As is clear from the foregoing explanation, the in-vehicle electronic control apparatus 10A according to Embodiment 1 of the present invention is provided with the main control circuit unit 20A that includes the non-volatile program memory 25A; the RAM memory 24 for calculation processing; the first input interface circuit 21 to which the first input sensor group 11a incorporating opening and closing sensors that operate at a variable frequency is connected; the first output interface circuit 22 to which the first electric load group 12a is connected; and the microprocessor 20 that controls the first electric load group 12a incorporating a load that intermittently operates at a variable frequency, in response to the contents of a control program stored in the non-volatile program memory 25A and the operation status of the first input sensor group 11a, and the monitoring control circuit unit 30A that is connected to the microprocessor 20, by unit of a pair of the serial interface circuits 27a and 37a, that performs communication with regard to the input and output signals, of the second input sensor group 11b and the second electric load group 12b, which are part of input and output signals for the microprocessor 20, and that includes the question information generation unit 605a that periodically and sequentially transmits question information items; the correct-information storage memory 35A that stores the correct information items for the question information items; and the abnormality determination unit 517 that compares the answer information, based on the question information, from the main control circuit unit 20A with the correct information stored in the correct-information storage memory 35A so as to determine whether or not an abnormality exists. The serial interface circuits 27a and 37a are connected between the main control circuit unit 20A and the monitoring control circuit unit 30A, and configure a full-duplex block communication circuit in which the multi-byte downlink communication information DND and uplink communication information UPD are simultaneously transmitted and received by use of the communication permission signal ALT and the communication synchronization signal CLK; the monitoring control circuit unit 30A is provided with the question information updating unit 604.

The downlink communication information DND is transmitted from the main control circuit unit 20A to the monitoring control circuit unit 30A and includes a setting constant or a control output that is required by the monitoring control circuit unit 30A, the answer information for the question information obtained from the immediately previous uplink communication information UPD, and the code check information. The uplink communication information UPD includes input signal information for the monitoring control circuit unit 30A or the storage information for the setting constant or the control output obtained from the main control circuit unit 20A, present question information, and code check information. The communication permission signal ALT is a signal that is periodically transmitted, through an independent control signal line, from the main control circuit unit 20A to the monitoring control circuit unit 30A and with which the main control circuit unit 20A permits the start of the full-duplex block communication. The communication synchronization signal CLK is transmitted, through an independent control signal line, from the monitoring control circuit unit 30A to the main control circuit unit 20A and has a train of pulses whose number corresponds to at least the number of the communication-information bits. The question information updating unit 604 recurrently transmits question information included in the uplink communication information UPD in such a way that the question information becomes the same in a plurality of times of communication and after transmitting of the question information for a predetermined duration, updates the question information; the main control circuit unit 20A generates the answer information for the question information before the predetermined duration elapses from the update of the question information.

The main control circuit unit 20A includes a fuel injection control function or an ignition coil control function in which engine interruption control is performed in response to the operation of the crank angle sensor; the main control circuit unit 20A also includes the direct memory access controller 27b connected between the serial interface circuit 27a and the RAM memory 24 for calculation processing. The communication permission signal ALT is a signal for periodically granting communication permission at an approximately constant frequency; however, when the interruption control is implemented, the communication permission signal ALT maintains the present logic level and when the interruption control is cancelled, the operating state thereof is restored. When the interruption control is implemented, the communication synchronization signal CLK maintains the pulse-train generating state or the pulse-train halting state. The direct memory access controller 27b is connected between the parallel input and output bus for the serial-parallel converter included in the serial interface circuit 27a and the data bus for the microprocessor 20, and transmits data to and receives data from the RAM memory 24 for calculation processing, without the intermediary of the microprocessor 20.

As described above, in the in-vehicle electronic control apparatus according to Embodiment 1, the main control circuit unit 20A includes a fuel injection control function or an ignition coil control function in which engine interruption control is performed in response to the operation of the crank angle sensor; the main control circuit unit 20A also includes a direct memory access controller for serial communication. Accordingly, the in-vehicle electronic control apparatus according to Embodiment 1 is characterized by making it possible to reduce the communication control load on the microprocessor and making it possible to implement serial communication even when the engine is rotating at a low speed, at a communication frequency approximately the same as the communication frequency when the engine is rotating at a high speed.

The number of the bits in the uplink communication information UPD is larger than the number of the bits in the downlink communication information DND; the main control circuit unit 20A and the monitoring control circuit unit 30A have the interrupted information processing unit 715b and 515b, respectively. The interrupted information processing unit 715b and 515b are unit in which, when the communication permission signal ALT is interrupted before the downlink communication is completed, the interrupted downlink communication information and uplink communication information are rescinded, and when the communication permission signal ALT is interrupted after the completion of the downlink communication and before the completion of the uplink communication, the downlink information is made effective, but the interrupted uplink communication information is rescinded.

As described above, in the in-vehicle electronic control apparatus according to Embodiment 1, the number of the bits in the uplink communication information is larger than the number of the bits in the downlink communication information; the main control circuit unit and the monitoring control circuit unit each have the interrupted information processing unit. Accordingly, the in-vehicle electronic control apparatus according to Embodiment 1 is characterized in that, even when having not completed the uplink communication, the main control circuit unit can interrupt the reception of the uplink communication information and give priority to the transmission of the next downlink communication information.

The communication permission signal ALT is an alternate signal whose logic level changes at a timing of communication permission; each time the logic level of the alternate signal ALT changes, the transmission start of a new communication block is permitted; when a constant logic level is maintained, after communication of a predetermined bits is completed, the present communication ends, and when the logic level reverses before the completion of communication of the predetermined bits, interruption processing of communication data is performed.

As described above, in the in-vehicle electronic control apparatus according to Embodiment 1, the communication permission signal ALT is an alternate signal whose logic level changes at a timing of communication permission. Accordingly, the in-vehicle electronic control apparatus according to Embodiment 1 is characterized in that a communication permission signal can be supplied by use of a minimally necessary control signal lines, and it is not required to halt the communication permission signal when the communication is completed.

The communication synchronization signal CLK is a pulse train signal that starts to be generated after the elapse of a predetermined waiting time $\tau$ from the timing when the monitoring control circuit unit 30A has received the communication permission signal ALT; after the occurrence of the communication synchronization signal CLK, a serial communication signal starts to travel in a stepping manner. The generation of pulses in the communication synchronization signal CLK is stopped after a train of pulses of a predetermined number corresponding to the number of transmission and reception bits has been generated, or the generation of pulses is continued even after a train of pulses of the predetermined number has been generated, the generation of pulses is temporarily stopped when the next communication permission signal ALT is generated, and then the generation of pulses is resumed after the elapse of the waiting time $\tau$; in the case where the next communication permission signal ALT is generated before the predetermined number of pulses have been generated, the generation of the rest pulses is terminated and after the elapse of the waiting time $\tau$, the generation of pulses is resumed.

As described above, in the in-vehicle electronic control apparatus according to Embodiment 1, the generation of the communication synchronization signal is started after the elapse of the predetermined waiting time $\tau$ from the timing when the monitoring control circuit unit has received the communication permission signal. Accordingly, the in-vehicle electronic control apparatus according to Embodiment 1 is characterized in that, during the waiting time, initialization processing of the communication is performed so that preparation for the start of transmission is made and the monitoring control circuit unit generates the communication synchronization signal, whereby the communication synchronization signal serves as a reception acknowledgement signal for the communication permission signal.

The monitoring control circuit unit 30A is configured in such a way as to include the multichannel AD converter 36 and the second input interface circuit 31 for the second input sensor group 11b incorporating an analogue sensor and to transmit the digitally converted value of the analogue signal to the main control circuit unit 20A, by way of the serial interface circuits 37a and 27a. The monitoring control circuit unit 30A issues an AD conversion start command to the multichannel AD converter 36, in response to the reception of the communication permission signal ALT, and starts the generation of the communication synchronization signal CLK at the timing of the reception of an AD conversion completion signal from the multichannel AD converter 36, at the timing when the time required for all-channel AD conversion has elapsed, or after such a delay time as the AD conversion has been completed before the transmission of the AD converted input signals is started.

As described above, in the in-vehicle electronic control apparatus according to Embodiment 1, the monitoring control circuit unit performs AD conversion for the analogue sensor during the waiting time between the generation of the communication permission signal and the generation of the communication synchronization signal, and the AD conversion is completed at latest by the timing when the AD conversion information is transmitted. Accordingly, the in-vehicle electronic control apparatus according to Embodiment 1 is characterized in that a latest AD conversion information can be transmitted.

The uplink communication information UPD includes the first flag information, and the downlink communication information DND includes the second flag information. The first flag information changes at the timing when the contents of the question information is updated in the monitoring control circuit unit 30A, and serves as a single-bit or multi-bit recognition signal that notifies of the change in the question information. The second flag information changes at the timing when the main control circuit unit 20A updates the contents of the answer information, in response to the update of the contents of the question information, and serves as a single-bit or multi-bit recognition signal that notifies of the update of the answer information.

As described above, in the in-vehicle electronic control apparatus according to Embodiment 1, the first and the second flag information for notifying the respective changes in the question information and the answer information are transmitted. Accordingly, the in-vehicle electronic control apparatus according to Embodiment 1 is characterized in that the main control circuit unit that receives the question signal is not required to compare the immediately previous question information with the present question information so as to detect the change, and the monitoring control circuit unit that receives the answer signal is not required to compare the immediately previous answer information with the present answer information so as to detect the change, whereby the question information and the answer information that are not accompanied by the change in the flag can be neglected.

The monitoring control circuit unit 30A is further provided with the response delay determination unit 516. The response delay determination unit 516 is a unit that determines that an abnormality exists in the main control circuit unit 20A, when the time between the timing when the monitoring control circuit unit 30A changes the contents of the first flag information and the timing when the reception data of the second flag information changes exceeds a predetermined time.

As described above, in the in-vehicle electronic control apparatus according to Embodiment 1, the delay of the answer information to the question information is detected through the change in the flag. Accordingly, the in-vehicle electronic control apparatus according to Embodiment 1 is characterized in that the delay of the answer information can readily be determined.

The monitoring control circuit unit 30A is further provided with the code error detection unit 514 and the reset processing unit 519. The code error detection unit 514 detects the intrusion of bit information or the loss of bit information in the downlink communication information DND, by use of a code check unit exemplified by the sum check or the CRC check. The reset processing unit 519 initializes and restarts the main control circuit unit 20A, in response to the result of monitoring/tallying of the fact that the abnormality determination unit 517 has determined an answer abnormality, the fact that the response delay determination unit 516 has determined an answer delay, or the fact that the code error detection unit 514 has detected an code error in the downlink communication information.

As described above, in the in-vehicle electronic control apparatus according to Embodiment 1, a reset processing unit is provided that responds to the result of monitoring/tallying of abnormalities detected by the abnormality determination unit, the response delay determination unit, and the code error detection unit. Accordingly, the in-vehicle electronic control apparatus according to Embodiment 1 is characterized in that the main control circuit unit can be initialized and restarted, in response not to the detection of a temporary abnormality due to erroneous operation caused by noise but to the detection of a continuous abnormality by diverse abnormality detection unit.

The downlink communication information DND includes the first tag information and the uplink communication information UPD includes the second tag information; the program memory 25A is provided with a control program corresponding to the tag abnormality determination unit 718a. The first tag information is numerical data that is determined by the main control circuit unit 20A and whose content changes each time the communication permission signal ALT is generated. The second tag information is numerical data, equal to the first tag information, that, in the next transmission, is returned as the second tag information by the monitoring control circuit unit 30A that has received the first tag information. The tag abnormality determination unit 718a is a counter-monitoring unit in which the main control circuit unit 20A determines whether or not the second tag information that is currently received from the monitoring control circuit unit 30A and the immediately previous first tag information that has been transmitted by the main control circuit unit 20A coincide with each other, and in the case where the foregoing tag information items do not coincide with each other, or in the case where the second tag information, which coincides with the immediately previous first tag information, is not obtained within a predetermined time, it is determined that an abnormality exists in the monitoring control circuit unit 30A.

As described above, in the in-vehicle electronic control apparatus according to Embodiment 1, the downlink communication information includes the first tag information and the uplink communication information includes the second tag information, and the program memory is provided with a control program corresponding to the tag abnormality determination unit. Accordingly, the in-vehicle electronic control apparatus according to Embodiment 1 is characterized in that, although, in the case where the contents of the input and output signals and the abnormality monitoring signals (the question signal and the answer signal) do not change, it cannot be ascertained whether or not normal communication is being performed, by making at least the tag information change every time, it can be determined whether or not normal communication has been performed.

The program memory 25A is further provided with a control program corresponding to the erroneous-answer transmission unit 403b and the tallied information monitoring unit 718b; the uplink communication information UPD includes tallied information obtained through abnormality-monitoring by the monitoring control circuit unit 30A. The erroneous-answer transmission unit 403b is a unit for intentionally transmitting erroneous-solution information, as the answer information, for the question information; The intentional transmission of an erroneous answer is performed by the erroneous-answer transmission unit 403b at the timing when there exist some margins for the tallied value in the abnormality monitoring and the reset processing unit 519 in the monitoring control circuit unit 30A is not caused to output a reset output by only a one-time erroneous-answer response. The tallied information monitoring unit 718b is a unit in which, by monitoring the tallied information, by the main control circuit unit 20A counter-monitors whether or not the monitoring control circuit unit 30A normally operates.

As described above, in the in-vehicle electronic control apparatus according to Embodiment 1, the program memory is further provided with a control program corresponding to the erroneous-answer transmission unit and the tallied information monitoring unit, and the uplink communication information includes tallied information obtained through abnormality-monitoring by the monitoring control circuit unit. Accordingly, the in-vehicle electronic control apparatus according to Embodiment 1 is characterized in that not only the behavior of the monitoring control circuit unit can be counter-monitored through the intentional transmission of an erroneous-answer, but also the intentional transmission of an erroneous-answer is prevented from causing the monitoring control circuit unit to generate a reset signal, thereby initializing the main control circuit unit.

The program memory 25A further includes a control program corresponding to the code error detection unit 714 or the stored-information abnormality determination unit 718c and the reset processing unit 719. The code error detection unit 714 detects the intrusion of bit information or the loss of bit information in the uplink communication information UPD, by use of a code check unit exemplified by the sum check or the CRC check. The storage state of the setting information and the output information that have been received and stored, as part of the downlink communication information DND, by the monitoring control circuit unit 30A and the acknowledgement information that has been received, as part of the uplink communication information UPD, by the main control circuit unit 20A are compared, in the main control circuit unit 20A, by the stored-information abnormality determination unit 718c so that whether or not an abnormality exists is determined. The reset processing unit 719 initializes and restarts the monitoring control circuit unit 30A, in response to the result of counter-monitoring/tallying of the fact that the code error detection unit 714 has detected a code error in the uplink communication information UPD, the fact that the stored-information abnormality determination unit 718c has detected an abnormality in the stored information, the fact that the tag abnormality determination unit 718a has determined that the tag information items are incoincident with each other or delayed, or the fact that the tallied information obtained through the abnormality monitoring by the tallied information monitoring unit 718b has been abnormal.

As described above, in the in-vehicle electronic control apparatus according to Embodiment 1, a reset processing unit is provided that responds to the result of counter-monitoring/tallying of abnormalities detected by the code error detection unit, the stored-information abnormality determination unit, the tag abnormality determination unit, and the tallied information monitoring unit. Accordingly, the in-vehicle electronic control apparatus according to Embodiment 1 is characterized in that the monitoring control circuit unit can be initialized and restarted, in response not to the detection of a temporary abnormality due to erroneous operation caused by noise but to the detection of a continuous abnormality by diverse counter-monitoring abnormality detection unit.

Embodiment 2

(1) Configuration of in-Vehicle Electronic Control Apparatus According to Embodiment 2

Figure 8:
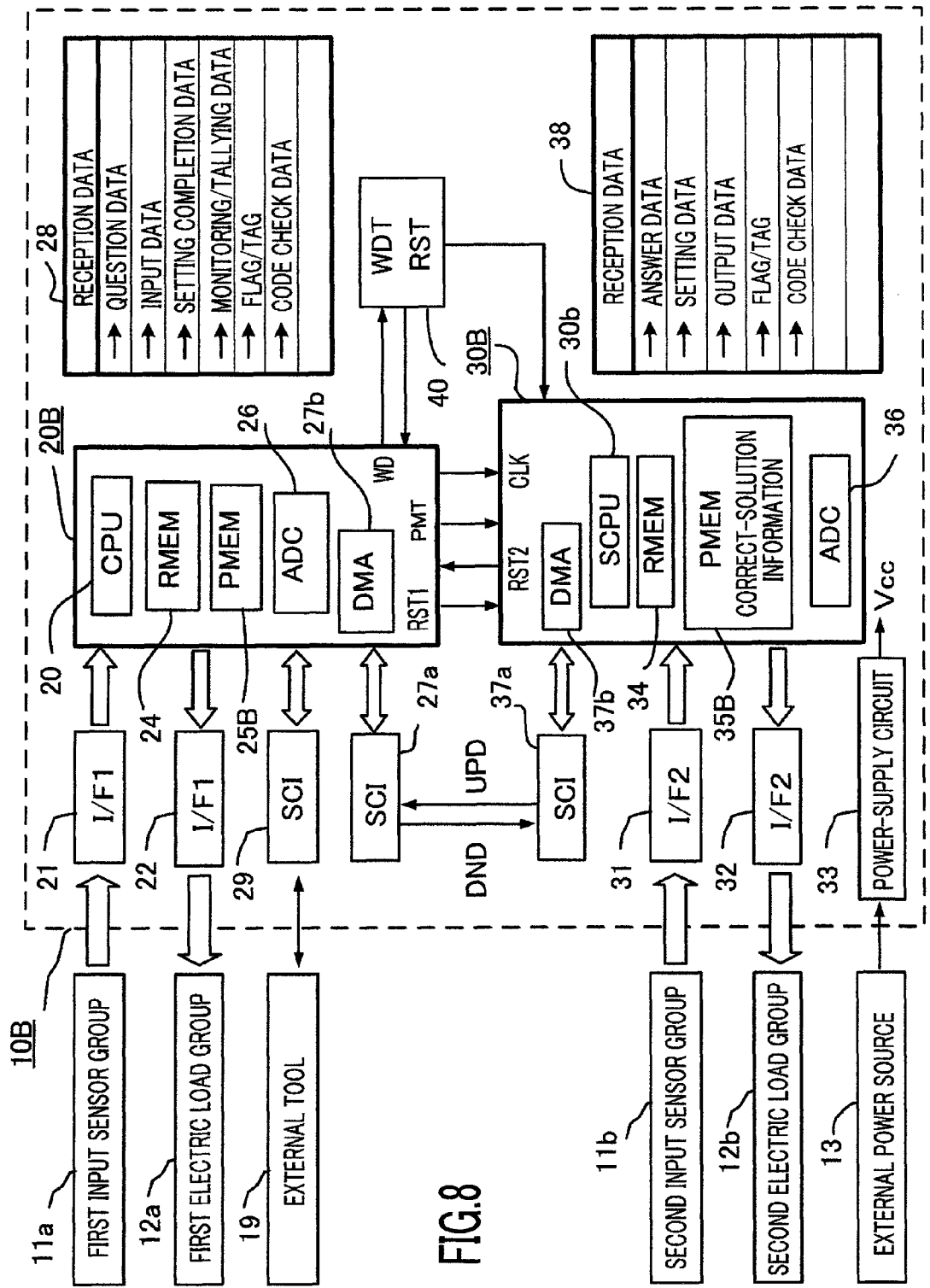
FIG. 8 is an overall block diagram illustrating an in-vehicle electronic control apparatus according to Embodiment 2 of the present invention.

The configuration of an in-vehicle electronic control apparatus according to Embodiment 2 will be explained in detail below, mainly with regard to what differs from the in-vehicle electronic control apparatus according to Embodiment 1. FIG. 8 is an overall block diagram illustrating an in-vehicle electronic control apparatus according to Embodiment 2 of the present invention. In FIG. 8, the same reference characters denote constituent elements that are the same as or equivalent to those in FIG. 1.

In FIG. 8, an in-vehicle electronic control apparatus 10B is provided with a main control circuit unit 20B formed mainly of a microprocessor 20 that collaborates with a program memory 25B and a monitoring control circuit unit 30B formed mainly of an auxiliary microprocessor 30b that collaborates with an auxiliary program memory 35B; the in-vehicle electronic control apparatus 10B is configured in such a way as to receive electric power from an external power source 13, which is an in-vehicle battery, so as to operate.

As is the case with FIG. 1, first and second sensor groups 11a and 11b, first and second electric load groups 12a and 12b, and an external tool 19 are externally connected to the electronic control apparatus 10B. As is the case with FIG. 1, first and second input interface circuits 21 and 31, first and second output interface circuits 22 and 32, serial interface circuits 27a and 37a, a tool interface circuit 29, a power-supply circuit 33, and a watchdog timer 40 are internally connected to the electronic control apparatus 10B; A direct memory access controller 37b is connected between the parallel input and output bus for the serial-parallel converter included in the serial interface circuit 37a and the data bus for the auxiliary microprocessor 30b, and transmits data to and receives data from a RAM memory 34 for calculation processing, without the intermediary of the auxiliary microprocessor 30b.

Similarly, the direct memory access controller 27b is connected between the parallel input and output bus for the serial-parallel converter included in the serial interface circuit 27a and the data bus for the microprocessor 20, and transmits data to and receives data from a RAM memory 24 for calculation processing, without the intermediary of the microprocessor 20.

Figure 10:
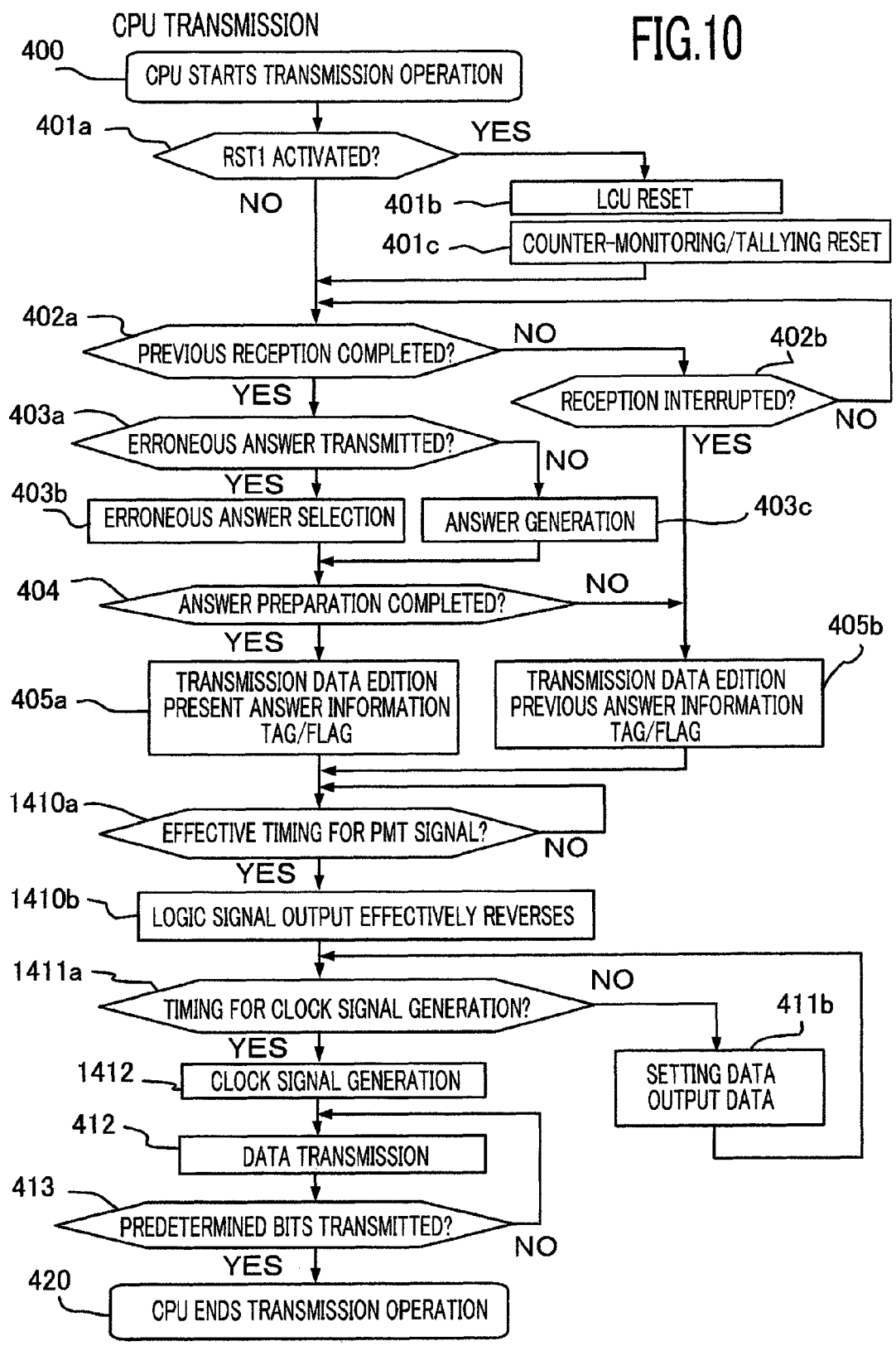
FIG. 10 is a flowchart for explaining the transmission operation of the main control circuit unit of the in-vehicle electronic control apparatus according to Embodiment 2 of the present invention.
Figure 12:
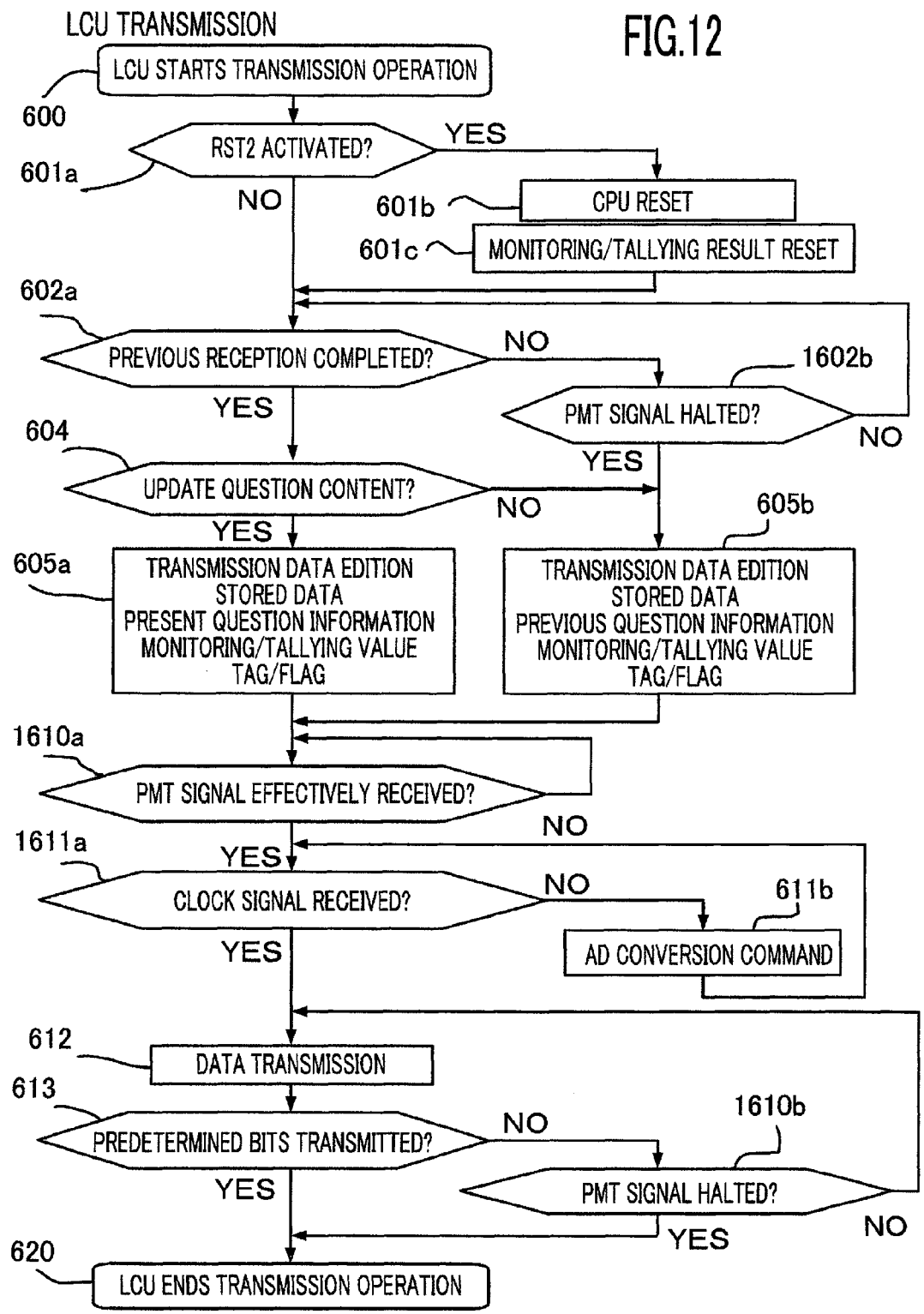
FIG. 12 is a flowchart for explaining the transmission operation of the monitoring control circuit unit of the in-vehicle electronic control apparatus according to Embodiment 2 of the present invention.
Figure 13:
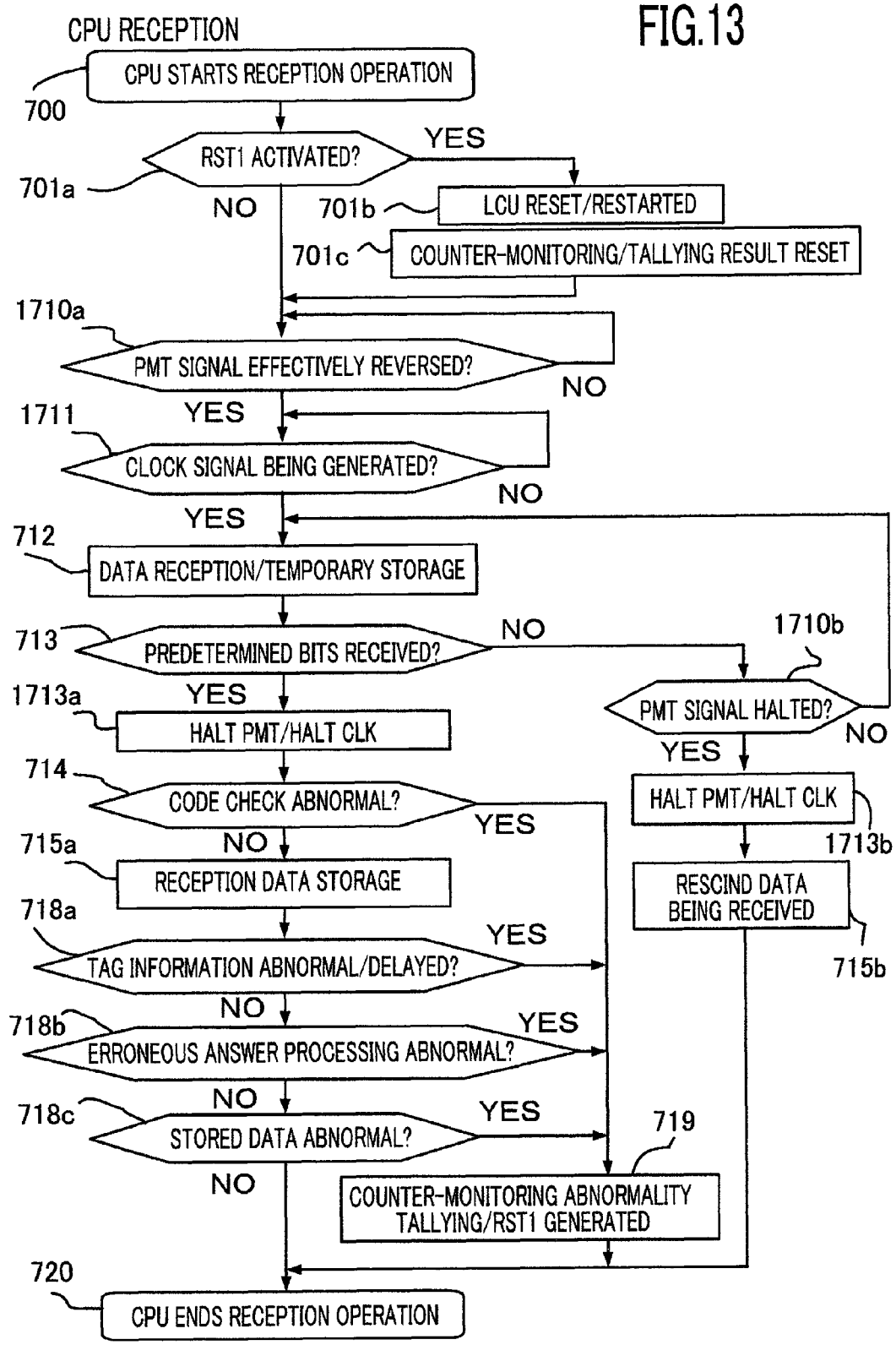
FIG. 13 is a flowchart for explaining the reception operation of the main control circuit unit of the in-vehicle electronic control apparatus according to Embodiment 2 of the present invention.

In addition, a control program corresponding to a communication control program, described later with reference to FIGS. 10 and 13, as well as an input and output control program is stored in the program memory 25B. Additionally, a control program corresponding to a communication control program, described later with reference to FIGS. 11 and 12, as well as an input and output processing program is stored in the auxiliary program memory 35B; correct-solution information for a Q&A diagnosis is also stored in the auxiliary program memory 35B.

The electronic control apparatus 10B is configured in such a way that serial interface circuits 27a and 37a, which are each formed of a pair of serial-parallel converters, configure a full-duplex block communication circuit, and downlink communication information DND transmitted from the main control circuit unit 20B to the monitoring control circuit unit 30B and uplink communication information UPD transmitted from the monitoring control circuit unit 30B to the main control circuit unit 20B can concurrently be transmitted and received. A communication permission signal PMT generated by the main control circuit unit 20B and a communication synchronization signal CLK will be described later with reference to FIG. 9.

Uplink communication storage information 28 is reception data that is stored in the RAM memory 24 through uplink communication and includes Q&A question information, input signal information obtained from the second input sensor group 11b, setting completion information described later, monitoring/tallying information, flag/tag information, and code check information.

Downlink communication storage information 38 is reception data that is stored in the RAM memory 34 through downlink communication and includes Q&A answer information, setting information, such as control constants, required by the monitoring control circuit unit 30B, output signal information for the second electric load group 12b, flag/tag information described later, and code check information.

As is the case with FIG. 1, the setting completion information in the uplink communication storage information 28 is information the same as either the setting information or the output signal information stored in the RAM memory 34; the electronic control apparatus 10B is configured in such a way that the main control circuit unit 20B can ascertain whether or not the setting information and the output signal information have been transmitted correctly.

The correct-solution information corresponding to question information is preliminarily stored in the auxiliary program memory 35B when the product is shipped; the auxiliary microprocessor 30b randomly transmits question information items and compares answer information items returned by the microprocessor 20 with corresponding correct-solution information items so as to monitor the operation status of the microprocessor 20; the microprocessor 20 sends an intentionally erroneous answer and counter-monitors whether or not the monitoring control circuit unit 30B performs appropriate monitoring and controlling.

As a result, when detecting an abnormality of the main control circuit unit 20B, the monitoring control circuit unit 30B initializes and restarts the main control circuit unit 20B by unit of a reset output RST2, and when detecting an abnormality of the monitoring control circuit unit 30B, the main control circuit unit 20B initializes and restarts the monitoring control circuit unit 30B by unit of a reset output RST1.

The watchdog timer 40 monitors a watchdog signal WD, which is a train of pulses generated by the microprocessor 20; when the pulse width of the watchdog signal WD exceeds a predetermined value, the watchdog timer 40 generates a reset pulse RST so as to initialize and restart the main control circuit unit 20B and the monitoring control circuit unit 30B. In addition, the auxiliary microprocessor 30b generates an unillustrated watchdog signal which is monitored by the microprocessor 20; when the pulse width of the watchdog signal exceeds a predetermined value, the microprocessor 20 generates an unillustrated reset pulse so as to initialize and restart the auxiliary microprocessor 30b.

Figure 9:
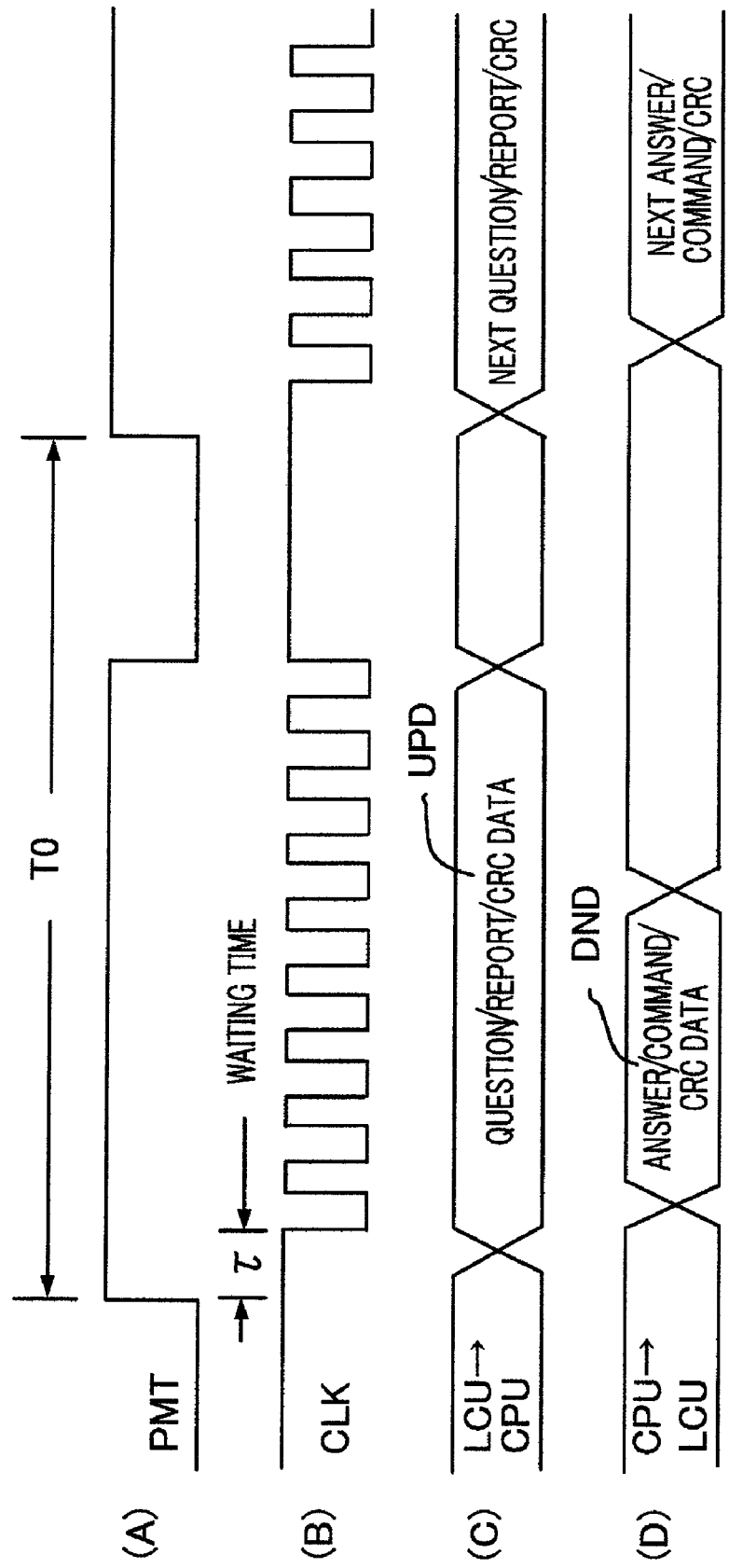
FIG. 9 is a timing chart for explaining serial communication in the in-vehicle electronic control apparatus according to Embodiment 2 of the present invention.

Next, serial communication in the in-vehicle electronic control apparatus, illustrated in FIG. 8, according to Embodiment 2 will be explained. FIG. 9 is a timing chart for explaining the serial communication. In FIG. 9(A), the communication permission signal PMT is a signal that is periodically transmitted, through an independent control signal line, from the main control circuit unit 20B to the monitoring control circuit unit 30B and with which the main control circuit unit 20B permits the start of full-duplex block communication;

the communication permission signal PMT in Embodiment 2 is an alternate signal whose logic level becomes "H" (or "L") during a communication permission period of time and "L" (or "H") during a non-permission period of time.

Accordingly, each time the logic level of the logic signal PMT effectively changes from "L" to "H", the transmission start of a new communication block is permitted; however, when a constant logic level is maintained, after communication of a predetermined bits is completed, the present communication ends, and when the logic level reverses before the completion of communication of the predetermined bits, interruption processing of communication data is performed.

In FIG. 9(B), the communication synchronization signal CLK is transmitted, through an independent control signal line, from the monitoring control circuit unit 20B to the main control circuit unit 30B and has a train of pulses whose number corresponds to at least the number of the communication-information bits. The communication synchronization signal CLK is a pulse train signal that starts to be generated after the elapse of a predetermined waiting time τ from the timing when the main control circuit unit 20B has generated the communication permission signal PMT; after the occurrence of the communication synchronization signal CLK, a serial communication signal starts to travel in a stepping manner.

The generation of pulses in the communication synchronization signal CLK is stopped after a train of pulses of a predetermined number corresponding to the number of transmission and reception bits has been generated, or the generation of pulses is continued even after a train of pulses of the predetermined number has been generated, the generation of pulses is temporarily stopped when the next communication permission signal PMT is generated, and then the generation of pulses is resumed after the elapse of the waiting time τ; in the case where the next communication permission signal PMT is generated before the predetermined number of pulses have been generated, the generation of the rest pulses is terminated and after the elapse of the waiting time τ, the generation of pulses is resumed.

In FIG. 9(C), the uplink communication information UPD represented includes input signal information for the monitoring control circuit unit 30B or report information which is the storage information for a setting constant or a control output obtained from the main control circuit unit 20B, present question information, and code check information; the data length thereof is, for example, 500 bits.

In FIG. 9(D), the downlink communication information DND includes command information, which is a setting constant or a control output that is transmitted from the main control circuit unit 20B to the monitoring control circuit unit 30B and required by the monitoring control circuit unit 30B, the answer information for question information obtained from the immediately previous uplink communication information UPD, and the code check information; the data length thereof is, for example, 100 bits. Accordingly, in order to perform transmission and reception of all the data, it is required that the number of generated pulses in the communication synchronization signal CLK is at least 500. In addition, while the communication permission period T0 of the communication permission signal PMT is, for example, 5 [msec], the time required to transmit or receive 500-bit data is, for example, 0.5 [msec].

The waiting time τ is a time of several hundreds of microseconds; during the waiting time τ, an AD conversion command for a multichannel AD converter 36 is generated, and AD conversions for all channels are completed. The transition chart for question information and answer information in the in-vehicle electronic control apparatus, illustrated in FIG. 8, according to Embodiment 2 is as represented in FIG. 3; however, in the case of the in-vehicle electronic control apparatus in FIG. 8, the logic signal PMT is utilized instead of the communication permission signal ALT and the period of the logic signal PMT is T0.

(2) Operation of in-Vehicle Electronic Control Apparatus According to Embodiment 2

The operation of the in-vehicle electronic control apparatus, configured as illustrated in FIG. 8, according to Embodiment 2 of the present invention will be explained in detail below. FIGS. 10 to 13 are flowcharts for explaining in detail the operation of the in-vehicle electronic control apparatus according to Embodiment 2 of the present invention. Embodiment 2 differs from Embodiment 1 only in the form of the communication permission signal PMT and in the generator of the communication synchronization signal CLK; therefore, the same reference characters are designated to the steps that are identical or equivalent to those in FIGS. 4 to 7 in Embodiment 1 described above. The following explanation will be made mainly for supplementarily explaining some steps whose reference characters are different from those of steps in FIGS. 4 to 7.

In the first place, in FIG. 8, when the external power source 13 is connected through an unillustrated power switch to the electronic control apparatus 10B, the microprocessor 20 drives and controls the first electric load group 12a and the second electric load group 12b, based on the operation statuses of the first input sensor group 11a and the second input sensor group 11b and the contents of a control program in the program memory 25B.

In particular, the first input sensor group 11a and the first electric load group 12a perform open/close and on/off operations, in synchronization with the rotation of the engine; for example, in the case where a 4-cylinder and 4-cycle gasoline engine rotates at a rotation speed of 6000 [rpm], the ignition control and the fuel injection control are performed in steps of 5 [msec]; however, in the case where the rotation speed of the engine is 600 [rpm], the foregoing controls may be performed in steps of 50 [msec].

In contrast, because not performing operations in synchronization with the rotation of the engine, the second input sensor group 11b and the second electric load group 12b do not perform frequent operations; however, because, when the operation status changes, signal communication is required to be rapidly performed, it is desirable that communication with a constant period is relatively frequently performed regardless of the rotation speed of the engine.

Next, the transmission operation of the main control circuit unit 20B illustrated in FIG. 8 will be explained. FIG. 10 is a flowchart for explaining the transmission operation of the main control circuit unit 20B. In FIG. 10, the step 400 is a step in which the microprocessor 20 starts its transmission operation for the monitoring control circuit unit 30B. In the step 1410a, which is a waiting step, it is determined whether or not the present timing is a timing for performing effective reversal, of the logic of the logic signal PMT which is a communication permission signal, from "L" to "H"; in the case where the present timing is a timing for the effective reversal, a determination "YES" is made and the step 1410a is followed by the step 1410b, and in the case where the present timing is not a timing for the effective reversal, a determination "NO" is made and the step 1410a is resumed. In addition, in the step 1410a, the reversal operation is carried out, for example, in steps of 5 [msec]; however, the microprocessor 20 performs interrupting control operation for input and output control, so that the period 5 [msec] changes.

In the step 1410b, the logic of the logic signal PMT is effectively reversed from "L" to "H", and then the step 1410b is followed by the step 1411a. In the step 1411a, it is determined whether or not the present timing is a timing for generating the communication synchronization signal CLK; in the case where a predetermined waiting time τ has not elapsed after the effective reversal, in the step 1410b, of the logic signal PMT, a determination "NO" is made and the step 1411a is followed by the step 411b, and in the case where the predetermined waiting time τ has elapsed, a determination "YES" is made and the step 1411a is followed by the step 1412. In the step 1412, the communication synchronization signal CLK is generated, and then the step 1412 is followed by the step 412. In addition, the communication permission signal PMT and the communication synchronization signal CLK generated in the steps 1410b and 1412, respectively, are to be halted in the steps 1713a and 1713b (refer to FIG. 13) described later. Other operations are the same as the operations in the flowchart, in FIG. 4, according to Embodiment 1.

Figure 11:
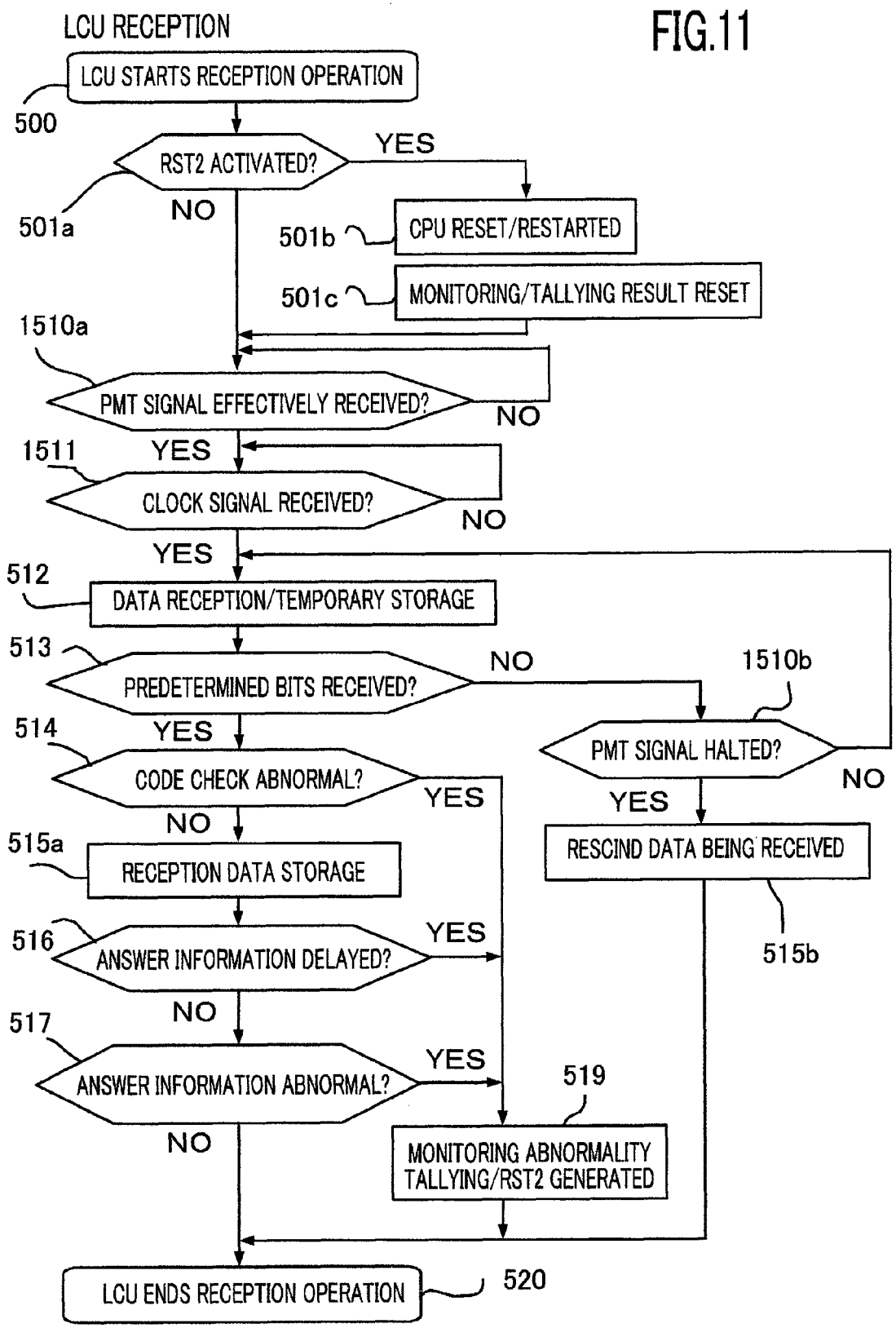
FIG. 11 is a flowchart for explaining the reception operation of the monitoring control circuit unit of the in-vehicle electronic control apparatus according to Embodiment 2 of the present invention.

Next, the reception operation of the monitoring control circuit unit 30B illustrated in FIG. 8 will be explained. FIG. 11 is a flowchart for explaining the reception operation of the monitoring control circuit unit 30B. In FIG. 11, the step 500 is a step in which the auxiliary microprocessor 30b starts its operation of receiving information from the main control circuit unit 20B. In the step 1510a, which is a waiting step, it is determined whether or not the logic level of the logic signal PMT, which is a communication permission signal transmitted from the main control circuit unit 20B, has effectively reversed from "L" to "H"; in the case where the logic level has effectively reversed, a determination "YES" is made and the step 1510a is followed by the step 1511, and in the case where the logic level has not effectively reversed, a determination "NO" is made and the step 1510a is resumed.

In the step 1511, it is determined whether or not the communication synchronization signal CLK generated in the step 1412 has been received; in the case where the communication synchronization signal CLK has been received, a determination "YES" is made and the step 1511 is followed by the step 512, and in the case where the communication synchronization signal CLK has not been received and the present timing is within the waiting time τ, a determination "NO" is made and the step 1511 is resumed. In the step 1510b, it is determined whether or not the logic signal PMT has halted and logically reversed to the logic level "L"; in the case where the logic signal PMT has not halted, a determination "NO" is made and the step 512 is resumed so that the reception operation is continued, and in the case where the logic signal PMT has halted, a determination "YES" is made and the step 1510b is followed by the step 515b. Other operations are the same as the operations in the flowchart, in FIG. 5, according to Embodiment 1.

Next, the transmission operation of the monitoring control circuit unit 30B illustrated in FIG. 8 will be explained. FIG. 12 is a flowchart for explaining the transmission operation of the monitoring control circuit unit 30B. In FIG. 12, the step 600 is a step in which the auxiliary microprocessor 30b starts its operation of transmitting information to the main control circuit unit 20B. In the step 1602b, it is determined whether or not the logic signal PMT has halted and the logic level has reversed from "H" to "L"; in the case where the logic signal PMT has not halted, a determination "NO" is made and the step 602a is resumed so that the reception operation is continued; in the case where the logic signal PMT has halted, a determination "YES" is made and the step 1602b is followed by the step 605b.

In the step 1610a, it is determined whether or not the logic signal PMT has been activated and the logic level has reversed from "L" to "H"; in the case where the logic signal PMT has not been activated, a determination "NO" is made and the step 1610a is resumed so that the reception operation enters into a standby state; in the case where the logic signal PMT has been activated, a determination "YES" is made and the step 1610a is followed by the step 1611a. In the step 1611a, it is determined whether or not the communication synchronization signal CLK generated by the main control circuit unit 20B has been received; in the case where the communication synchronization signal CLK has not been received, a determination "NO" is made and the step 1611a is followed by the step 611b, and in the case where the communication synchronization signal CLK has been received, a determination "YES" is made and the step 1611a is followed by the step 612.

In the step 1610b, it is determined whether or not the logic signal PMT has halted and the logic level has reversed from "H" to "L"; in the case where the logic signal PMT has not halted, a determination "NO" is made and the step 612 is resumed so that the transmission operation is continued; in the case where the logic signal PMT has halted, a determination "YES" is made and the step 1610b is followed by the operation end step 620. Other operations are the same as the operations in the flowchart, in FIG. 6, according to Embodiment 1.

Next, the reception operation of the main control circuit unit 20B illustrated in FIG. 8 will be explained. FIG. 13 is a flowchart for explaining the reception operation of the main control circuit unit 20B. In FIG. 13, the step 700 is a step in which the microprocessor 20 starts its operation of receiving information from the monitoring control circuit unit 30B. In the step 1710a, which is a waiting step, it is determined whether or not the logic level of the logic signal PMT has effectively reversed from "L" to "H" in the step 1410b; in the case where the logic level has not effectively reversed, a determination "NO" is made and the step 1710a is resumed, and in the case where the logic level has effectively reversed, a determination "YES" is made and the step 1710a is followed by the step 1711.

In the step 1711, which is a waiting step, it is determined whether or not the communication synchronization signal CLK is being generated in the step 1412; in the case where the communication synchronization signal CLK is being generated, a determination "YES" is made and the step 1711 is followed by the step 712, and in the case where the communication synchronization signal CLK is not being generated, a determination "NO" is made and the step 1711 is resumed.

In the step 1710b, it is determined whether or not the logic signal PMT has halted and the logic level has reversed from "H" to "L"; in the case where the logic signal PMT has not halted, a determination "NO" is made and the step 712 is resumed so that the reception operation is continued; in the case where the logic signal PMT has halted, a determination "YES" is made and the step 1710b is followed by the step 1713b. In the steps 1713a and 1713b, the logic signal PMT that has effectively reversed in the step 1410b is halted so as to reverse the logic level from "H" to "L", and the communication synchronization signal CLK that has been started to be generated in the step 1412 is halted.

(3) Gist and Features of in-Vehicle Electronic Control Apparatus According to Embodiment 2

As is clear from the foregoing explanation, the in-vehicle electronic control apparatus 10B according to Embodiment 2 of the present invention is provided with the main control circuit unit 20B that includes the non-volatile program memory 25B; the RAM memory 24 for calculation processing; the first input interface circuit 21 to which the first input sensor group 11a incorporating opening and closing sensors that operate at a variable frequency is connected; the first output interface circuit 22 to which the first electric load group 12a is connected; and the microprocessor 20 that controls the first electric load group 12a incorporating a load that intermittently operates at a variable frequency, in response to the contents of a control program stored in the non-volatile program memory 25B and the operation status of the first input sensor group 11a, and provided with the monitoring control circuit unit 30B that is connected to the microprocessor 20, by unit of a pair of the serial interface circuits 27a and 37a, that performs communication with regard to the input and output signals, of the second input sensor group 11b and the second electric load group 12b, which are part of input and output signals for the microprocessor 20, and that includes the question information generation unit 605a that periodically and sequentially transmits question information items; the correct-information storage memory 35B that stores the correct information items for the question information items; and the abnormality determination unit 517 that compares the answer information, based on the question information, from the main control circuit unit 20B with the correct information stored in the correct-information storage memory 35B so as to determine whether or not an abnormality exists. The serial interface circuits 27a and 37a are connected between the main control circuit unit 20B and the monitoring control circuit unit 30B, and configure a full-duplex block communication circuit in which the multi-byte downlink communication information DND and uplink communication information UPD are simultaneously transmitted and received by use of the communication permission signal PMT and the communication synchronization signal CLK; the monitoring control circuit unit 30B is provided with the question information updating unit 604.

The downlink communication information DND is transmitted from the main control circuit unit 20B to the monitoring control circuit unit 30B and includes a setting constant or a control output that is required by the monitoring control circuit unit 30B, the answer information for the question information obtained from the immediately previous uplink communication information UPD, and the code check information. The uplink communication information UPD includes input signal information for the monitoring control circuit unit 30B or the storage information for the setting constant or the control output obtained from the main control circuit unit 20B, present question information, and code check information. The communication permission signal PMT is a signal that is periodically transmitted, through an independent control signal line, from the main control circuit unit 20B to the monitoring control circuit unit 30B and with which the main control circuit unit 20B permits the start of the full-duplex block communication.

The communication synchronization signal CLK is transmitted, through an independent control signal line, from the main control circuit unit 20B to the monitoring control circuit unit 30B and has a train of pulses whose number corresponds to at least the number of the communication-information bits. The question information updating unit 604 recurrently transmits question information included in the uplink communication information UPD in such a way that the question information becomes the same in a plurality times of communication and after transmitting of the question information for a predetermined duration, updates the question information; the main control circuit unit 20B generates the answer information for the question information before the predetermined duration elapses from the update of the question information.

The main control circuit unit 20B includes a fuel injection control function or an ignition coil control function in which engine interruption control is performed in response to the operation of the crank angle sensor is performed; the main control circuit unit 20B also includes the direct memory access controller 27b connected between the serial interface circuit 27a and the RAM memory 24 for calculation processing. The communication permission signal PMT is a signal for periodically granting communication permission at an approximately constant frequency; however, when the interruption control is implemented, the communication permission signal ALT maintains the present logic level and when the interruption control is cancelled, the operating state thereof is restored. When the interruption control is implemented, the communication synchronization signal CLK maintains the pulse-train generating state or the pulse-train halting state. The direct memory access controller 27b is connected between the parallel input and output bus for the serial-parallel converter included in the serial interface circuit 27a and the data bus for the microprocessor 20, and transmits data to and receives data from the RAM memory 24 for calculation processing, without the intermediary of the microprocessor 20.

The number of bits in the uplink communication information UPD is larger than the number of bits in the downlink communication information DND; the main control circuit unit 20B and the monitoring control circuit unit 30B have the interrupted information processing unit 715b and 515b, respectively. The interrupted information processing unit 715b and 515b are unit in which, when the communication permission signal PMT is interrupted before the downlink communication is completed, the interrupted downlink communication information and uplink communication information are rescinded, and when the communication permission signal PMT is interrupted after the completion of the downlink communication and before the completion of the uplink communication, the downlink information is made effective, but the interrupted uplink communication information is rescinded.

The communication permission signal is the logic signal PMT whose logic level becomes one of "H" and "L" during a communication permission period of time and the other during a non-permission period of time. Each time the logic level of the logic signal PMT changes over to the one of logic levels, the transmission start of a new communication block is permitted; when a constant logic level is maintained, after communication of a predetermined bits is completed, the present communication ends, and when the logic level reverses to the other of the logic levels before the completion of communication of the predetermined bits, interruption processing of communication data is performed.

As described above, in the in-vehicle electronic control apparatus according to Embodiment 2 of the present invention, the communication permission signal is a logic signal whose logic level becomes, for example, "H" during a communication permission period of time and "L" during a non-permission period of time. Accordingly, the in-vehicle electronic control apparatus according to Embodiment 2 is characterized in that, because a communication permission signal can be supplied by use of a minimally necessary control signal lines and the communication permission signal is halted when the communication is completed, the microprocessor can determine the communication non-permission time.

The communication synchronization signal CLK is a pulse train signal that starts to be generated after the elapse of a predetermined waiting time τ from the timing when the main control circuit unit 20B has generated the communication permission signal PMT; after the occurrence of the communication synchronization signal CLK, a serial communication signal starts to travel in a stepping manner. The generation of pulses in the communication synchronization signal CLK is stopped after a train of pulses of a predetermined number corresponding to the number of transmission and reception bits has been generated, or the generation of pulses is continued even after a train of pulses of the predetermined number has been generated, the generation of pulses is temporarily stopped when the next communication permission signal PMT is generated, and then the generation of pulses is resumed after the elapse of the waiting time τ; in the case where the next communication permission signal PMT is generated before the predetermined number of pulses have been generated, the generation of the rest pulses is terminated and after the elapse of the waiting time τ, the generation of pulses is resumed.

As described above, in the in-vehicle electronic control apparatus according to Embodiment 2 of the present invention, the generation of the communication synchronization signal is started after the elapse of the predetermined waiting time τ from the timing when the main control circuit unit 20B has generated the communication permission signal. Accordingly, by performing initialization processing of communication during the waiting time, a preparation for transmission can be made.

The monitoring control circuit unit 30B includes the multichannel AD converter 36 and the second input interface circuit 31 for the second input sensor group 11b incorporating an analogue sensor and transmits the digitally converted value of the analogue signal to the main control circuit unit 20B, by way of the serial interface circuits 37a and 27a. The monitoring control circuit unit 30B issues an AD conversion start command to the multichannel AD converter 36, in response to the reception of the communication permission signal PMT; the main control circuit unit 20B starts the generation of the communication synchronization signal CLK at the timing when the time required for all-channel AD conversion has elapsed, or after such a delay time as the AD conversion has been completed before the transmission of the AD converted input signals is started.

The uplink communication information UPD includes the first flag information, and the downlink communication information DND includes the second flag information. The first flag information changes at the timing when the contents of the question information is updated in the monitoring control circuit unit 30B, and serves as a single-bit or multi-bit recognition signal that notifies of the change in the question information. The second flag information changes at the timing when the main control circuit unit 20B updates the contents of the answer information, in response to the update of the question information, and serves as a single-bit or multi-bit recognition signal that notifies of the update of the answer information.

The monitoring control circuit unit 30B is further provided with the response delay determination unit 516. The response delay determination unit 516 is a unit that determines that an abnormality exists in the main control circuit unit 20B, when the time between the timing when the monitoring control circuit unit 30B changes the contents of the first flag information and the timing when the reception data of the second flag information changes exceeds a predetermined time.

The monitoring control circuit unit 30B is further provided with the code error detection unit 514 and the reset processing unit 519. The code error detection unit 514 detects the intrusion of bit information or the loss of bit information in the downlink communication information DND, by use of a code check unit exemplified by the sum check or the CRC check. The reset processing unit 519 initializes and restarts the main control circuit unit 20B, in response to the result of monitoring/tallying of the fact that the abnormality determination unit 517 has determined an answer abnormality, the fact that the response delay determination unit 516 has determined an answer delay, or the fact that the code error detection unit 514 has detected an code error in the downlink communication information.

The monitoring control circuit unit 30B includes the auxiliary microprocessor 30b, and the auxiliary non-volatile program memory 35B and the auxiliary RAM memory 34 that collaborate with the auxiliary microprocessor 30b. The auxiliary non-volatile program memory 35B includes a control program corresponding to the abnormality determination unit 517, the response delay determination unit 516, the code error determination unit 514 for the downlink communication information, and the reset processing unit 519; the auxiliary non-volatile program memory 35B also stores the correct-solution information for the question information. The result of the monitoring/tallying is written in the auxiliary RAM memory 34.

As described above, in the in-vehicle electronic control apparatus according to Embodiment 2 of the present invention, the monitoring control circuit unit includes the auxiliary microprocessor, the auxiliary non-volatile program memory, and the auxiliary RAM memory. Accordingly, the in-vehicle electronic control apparatus according to Embodiment 2 is characterized in that the specification of the abnormality monitoring and control can readily be changed by use of the control program stored in the auxiliary non-volatile program memory.

The downlink communication information DND includes the first tag information and the uplink communication information UPD includes the second tag information; the program memory 25B is provided with a control program corresponding to the tag abnormality determination unit 718a. The first tag information is numerical data that is determined by the main control circuit unit 20B and whose content changes each time the communication permission signal PMT is generated. The second tag information is numerical data, equal to the first tag information, that, in the next transmission, is returned as the second tag information by the monitoring control circuit unit 30B that has received the first tag information. The tag abnormality determination unit 718a is a counter-monitoring unit in which the main control circuit unit 20B determines whether or not the second tag information that is currently received from the monitoring control circuit unit 30B and the immediately previous first tag information that has been transmitted by the main control circuit unit 20B coincide with each other, and in the case where the foregoing tag information items do not coincide with each other, or in the case where the second tag information, which coincides with the immediately previous first tag information, is not obtained within a predetermined time, it is determined that an abnormality exists in the monitoring control circuit unit 30B.

The program memory 25B is further provided with a control program corresponding to the erroneous-answer transmission unit 403b and the tallied information monitoring unit 718b; the uplink communication information UPD includes tallied information obtained through abnormality-monitoring by the monitoring control circuit unit 30B. The erroneous-answer transmission unit 403b is a unit for intentionally transmitting erroneous-solution information, as the answer information, for the question information; the intentional transmission of an erroneous answer is performed by the erroneous-answer transmission unit 403b at the timing when there exist some margins for the tallied value in the abnormality monitoring and the reset processing unit 519 in the monitoring control circuit unit 30B is not caused to output a reset output by only a one-time erroneous-answer response. The tallied information monitoring unit 718b is a unit in which, by monitoring the tallied information, the main control circuit unit 20B counter-monitors whether or not the monitoring control circuit unit 30B normally operates.

The program memory 25B further includes a control program corresponding to the code error detection unit 714 or the stored-information abnormality determination unit 718c and the reset processing unit 719. The code error detection unit 714 detects the intrusion of bit information or the loss of bit information in the uplink communication information UPD, by use of a code check unit exemplified by the sum check or the CRC check. The storage state of the setting information and the output information that have been received and stored, as part of the downlink communication information DND, by the monitoring control circuit unit 30B and the acknowledgement information that has been received, as part of the uplink communication information UPD, by the main control circuit unit 20B are compared, in the main control circuit unit 20A, by the stored-information abnormality determination unit 718c so that whether or not an abnormality exists is determined. The reset processing unit 719 initializes and restarts the monitoring control circuit unit 30B, in response to the result of counter-monitoring/tallying of the fact that the code error detection unit 714 has detected a code error in the uplink communication information UPD, the fact that the stored-information abnormality determination unit 718c has detected an abnormality in the stored information, the fact that the tag abnormality determination unit 718a has determined that the tag information items are incoincident with each other or delayed, or the fact that the tallied information obtained through the abnormality monitoring by the tallied information monitoring unit 718b has been abnormal.

Supplement for Embodiments 1 and 2

In the block communication circuit according to each of Embodiments 1 and 2, data included in a single communication instance incorporates information for all subject addresses; as a result, because the addresses for transmission destinations are preliminarily assigned in accordance with the transmission order, no address data for the transmission data is required; therefore, the amount of communication data is considerably reduced. As a result of collectively transmitting all the data, the abnormality monitoring signal is transmitted along with input and output signals that are relatively frequently communicated, and a problem occurs in which the control load on the microprocessor for generating the answer information increases; however, the substantial question occurrence period can be prolonged by use of the question information updating unit. Accordingly, an effect is demonstrated in which, by performing constant-period communication of the input and output signals for the second input sensor group and the second electric load group and communication of a prolonged constant-period abnormality monitoring signal, while performing variable-period input and output control on the first input sensor group and the first electric load group, not only the microprocessor can perform relatively frequent communication of part of the input and output signals and constant- and low-frequency abnormality monitoring, but also the controlling load on the microprocessor due to excess-frequency abnormality monitoring control can be reduced. Moreover, an effect is demonstrated in which, even though the operation frequencies of the second input sensor group and the second electric load group are low, a change, when it occurs, can rapidly be transferred to the opposite side, by relatively frequently performing communication of the input and output signals.

Variant Examples of Embodiments 1 and 2

In Embodiment 1 illustrated in FIG. 1, the in-vehicle electronic control apparatus is configured in such a way that the logic circuit unit 30a is provided in the monitoring control circuit unit 30A, the communication permission signal is the alternate signal ALT, and the communication synchronization signal CLK is generated by the monitoring control circuit unit 30A; however, instead of the logic circuit unit 30a, the auxiliary microprocessor 30b described in Embodiment 2 illustrated in FIG. 8 can also be utilized. In the case where the auxiliary microprocessor 30b is utilized, the in-vehicle electronic control apparatus is characterized in that, by changing the contents of the data memory 35A, the operation specification of the monitoring control circuit unit can relatively readily be changed.

In Embodiment 2 illustrated in FIG. 8, the in-vehicle electronic control apparatus is configured in such a way that the auxiliary microprocessor 30b is provided in the monitoring control circuit unit 30B, the communication permission signal is the logic signal PMT, and the communication synchronization signal CLK is generated by the main control circuit unit 20B; however, instead of the auxiliary microprocessor 30b, the logic circuit unit 30a described in Embodiment 1 illustrated in FIG. 1 can also be utilized. In the case where the logic circuit unit 30a is utilized, the in-vehicle electronic control apparatus is characterized in that, even though the control specification of the monitoring control circuit unit becomes difficult to change, an inexpensive integrated circuit device can be formed without utilizing the auxiliary microprocessor 30b and the auxiliary program memory 35B.

In the foregoing explanation, question information and the correct-solution information corresponding to the question information are preliminarily written in the data memory 35A or the auxiliary program memory 35B; however, the in-vehicle electronic control apparatus may be configured in such a way that the question information and the correct-solution information corresponding to the question information are written, through an external tool, in the program memory 25A or 25B, and the question information and the correct-solution information written in the program memory are transmitted, as setting data in the downlink communication information, to a RAM memory in the monitoring control circuit unit.

Additionally, in the foregoing explanation, the in-vehicle electronic control apparatus is configured in such a way that, when detecting abnormalities of the main control circuit units 20A and 20B, the monitoring control circuit units 30A and 30B initialize and restart the main control circuit units 20A and 20B, respectively; however, the in-vehicle electronic control apparatus can be configured in such a way that, instead of the initialization and restart of the main control circuit unit 20A or 20B, the power supply relay for the throttle-valve opening level controlling motor is de-energized so that the operation state of the engine moves to the power-saving drive mode, through a predetermined default valve opening level.

The question information is a program that is the same as a control program corresponding to at least one calculation expression that is utilized in the microprocessor 20 or the content of which is the same as that of the control program; the question information designates a copy program, stored in a different region of the program memory 25A or 25B, as the program to be tested, and designates an input-constant table number corresponding to input data utilized in the program to be tested. The input-constant table number is stored in the program memory 25A or 25B; the in-vehicle electronic control apparatus can be configured in such a way that the main control circuit unit 20A or 20B transmits the result of a calculation based on the calculation expression and the input constant designated by the question information, as answer information, "to" the monitoring control circuit unit 30A or 30B.

The input sensors include at least an accelerator position sensor for detecting the accelerator-pedal depressing level, an airflow sensor for measuring the air intake amount of the engine, and an engine rotation sensor for calculating the engine rotation speed; the electric load group is provided with at least a motor for controlling the valve opening level; the program to be tested is a control program for determining the throttle valve opening level in response to a detection signal from the input sensor; the input constant table represents a set of fixed constants in accordance with the accelerator position sensor, the airflow sensor, and the engine rotation speed; a plurality kinds of the input constant tables may be stored in the program memory, in consideration of a plurality kinds of driving conditions.

Various modifications and alterations of this invention will be apparent to those skilled in the art without departing from the scope and spirit of this invention, and it should be understood that this is not limited to the illustrative embodiments set forth herein.

What is claimed is:

1. An in-vehicle electronic control apparatus, having a monitoring control circuit, comprising:
   a main control circuit unit including:
      a non-volatile program memory;
      a RAM memory for calculation processing;
      a first input interface circuit to which a first input sensor group incorporating opening and closing sensors that operate at a variable frequency is connected;
      a first output interface circuit to which a first electric load group incorporating loads that operate at a variable frequency is connected;
      a microprocessor that controls the first electric load group, in response to contents of a control program stored in the non-volatile program memory and an operation status of the first input sensor group, and
   a monitoring control circuit unit including:
      a question information generation unit that is connected to the microprocessor through a pair of serial interface circuits, that performs communication with regard to input and output signals, of the second input sensor group and the second electric load group, which are part of input and output signals for the microprocessor, and that periodically and sequentially transmits question information items to the main control circuit unit;
      a correct-information storage memory that stores correct information items for the question information items; and
      an abnormality determination unit that compares answer information, based on the question information, from the main control circuit unit with the correct information stored in the correct-information storage memory so as to determine whether or not an abnormality exists in the main control circuit unit,
   wherein the serial interface circuits are connected between the main control circuit unit and the monitoring control circuit unit, and configure a full-duplex block communication circuit in which multi-byte downlink communication information and uplink communication information are simultaneously transmitted and received based on a communication permission signal and a communication synchronization signal;
   wherein the monitoring control circuit unit is provided with a question information updating unit;
   wherein the downlink communication information is transmitted through downlink communication from the main control circuit unit to the monitoring control circuit unit and includes a setting constant or a control output that is required by the monitoring control circuit unit, answer information for the question information obtained from the immediately previous uplink communication information, and code check information;
   wherein the uplink communication information is transmitted through uplink communication from the monitoring control circuit unit to the main control circuit unit and includes input signal information for the monitoring control circuit unit or storage information for the setting constant or the control output obtained from the main control circuit unit, present question information, and code check information;
   wherein the communication permission signal is a signal that is periodically transmitted, through an independent control signal line, from the main control circuit unit to the monitoring control circuit unit and with which the main control circuit unit permits the monitoring control circuit unit to start the full-duplex block communication;
   wherein the communication synchronization signal is transmitted, through an independent control signal line, from the monitoring control circuit unit to the main control circuit unit or from the main control circuit unit to the monitoring control circuit unit and has a train of pulses whose number corresponds to at least the number of communication-information bits;
   wherein the question information updating unit recurrently transmits question information included in the uplink communication information in such a way that the question information becomes the same in a plurality times of communication, and after transmitting of the question information for a predetermined duration, updates the question information; and
   wherein the main control circuit unit generates answer information for the question information before the predetermined duration elapses from the update of the question information.

2. The in-vehicle electronic control apparatus, having a monitoring control circuit, according to claim 1,
   wherein the main control circuit unit includes a fuel injection control function, or an ignition coil control function, in which engine interruption control is performed in response to the operation of a crank angle sensor, and includes a direct memory access controller connected between the serial interface circuit and the RAM memory for calculation processing;
   wherein the communication permission signal is a signal for periodically granting communication permission at an approximately constant frequency, and when the interruption control is implemented, maintains the present logic level and when the interruption control is cancelled, the operating state thereof is restored;

wherein, when the interruption control is implemented, the communication synchronization signal maintains the pulse-train generating state or the pulse-train halting state thereof; and wherein the direct memory access controller is connected between a parallel input and output bus for a serial-parallel converter included in the serial interface circuit and a data bus for the microprocessor, and transmits data to and receives data from the RAM memory for calculation processing, without the intermediary of the microprocessor.

3. The in-vehicle electronic control apparatus, having a monitoring control circuit, according to claim 1, wherein the number of bits in the uplink communication information is larger than the number of bits in the downlink communication information; and wherein the main control circuit unit and the monitoring control circuit unit each have an interrupted information processing unit in which, when the communication permission signal is interrupted before the downlink communication is completed, the interrupted downlink communication information and uplink communication information are rescinded, and when the communication permission signal is interrupted after the completion of the downlink communication and before the completion of the uplink communication, the downlink information is made effective, but the interrupted uplink communication information is rescinded.

4. The in-vehicle electronic control apparatus, having a monitoring control circuit, according to claim 1, wherein the communication permission signal is an alternate signal whose logic level changes at a timing of communication permission; each time the logic level of the alternate signal changes, the transmission start of a new communication block is permitted; and when a constant logic level thereof is maintained, after communication of a predetermined bits is completed, the present communication ends, and when the logic level reverses before the completion of communication of the predetermined bits, interruption processing of communication data is performed.

5. The in-vehicle electronic control apparatus, having a monitoring control circuit, according to claim 1, wherein the communication permission signal is a logic signal whose logic level becomes one of "H" and "L" during a communication permission period of time and the other during a non-permission period of time; each time the logic level of the logic signal thereof changes over to the one of logic levels, the transmission start of a new communication block is permitted; and when a constant logic level is maintained, after communication of a predetermined bits is completed, the present communication ends, and when the logic level reverses to the other of the logic levels before the completion of communication of the predetermined bits, interruption processing of communication data is performed.

6. The in-vehicle electronic control apparatus, having a monitoring control circuit, according to claim 1, wherein the communication synchronization signal is a pulse train signal the generation of which is started after the elapse of a predetermined waiting time from the timing when the monitoring control circuit unit has received the communication permission signal, or after the elapse of a predetermined waiting time from the timing when the main control circuit unit has generated the communication permission signal, and after the occurrence of which, a serial communication signal starts to travel in a stepping manner; and wherein generation of pulses in the communication synchronization signal is stopped after a train of pulses of a predetermined number corresponding to the number of transmission and reception bits has been generated, or even after a train of pulses of the predetermined number has been generated, generation of pulses is continued, the generation of pulses is temporarily stopped when the next communication permission signal is generated, and then generation of pulses is resumed after the elapse of the waiting time, and in the case where the next communication permission signal is generated before the predetermined number of pulses have been generated, the generation of the remaining pulses is omitted and after the elapse of the waiting time, generation of pulses is resumed.

7. The in-vehicle electronic control apparatus, having a monitoring control circuit, according to claim 6, wherein the monitoring control circuit unit includes a multichannel AD converter and a second input interface circuit for the second input sensor group incorporating an analogue sensor and transmits a digitally converted value of the analogue signal to the main control circuit unit, by way of the serial interface circuits;

wherein the monitoring control circuit unit issues an AD conversion start command to the multichannel AD converter, in response to the reception of the communication permission signal; and wherein the monitoring control circuit unit or the main control circuit unit starts generation of the communication synchronization signal at the timing of the reception of an AD conversion completion signal from the multichannel AD converter, or at the timing when the time required for all-channel AD conversion has elapsed, or after such a delay time as the AD conversion has been completed before transmission of the AD converted input signals is started.

8. The in-vehicle electronic control apparatus, having a monitoring control circuit, according to claim 1, wherein the uplink communication information includes first flag information, and the downlink communication information includes second flag information;

wherein the first flag information changes at the timing when the contents of the question information is updated in the monitoring control circuit unit, and serves as a single-bit or multi-bit recognition signal that notifies of the change in the question information; and wherein the second flag information changes at the timing when the main control circuit unit updates the contents of the answer information, in response to an update of the contents of the question information, and serves as a single-bit or multi-bit recognition signal that notifies of the update of the answer information.

9. The in-vehicle electronic control apparatus, having a monitoring control circuit, according to claim 8, wherein the monitoring control circuit unit is provided with a response delay determination unit that determines that an abnormality exists in the main control circuit unit, when the time between the timing when the monitoring control circuit unit changes the contents of the first flag information and the timing when the reception data of the second flag information changes exceeds a predetermined time.

10. The in-vehicle electronic control apparatus, having a monitoring control circuit, according to claim 9, wherein the monitoring control circuit unit is provided with a code error detection unit and a reset processing unit;
wherein the code error detection unit detects an intrusion of bit information or a loss of bit information in the reception data of the downlink communication information, by use of a code check unit exemplified by the sum check or the CRC check; and
wherein the reset processing unit initializes and restarts the main control circuit unit, in response to the result of monitoring and tallying of at least of one of the fact that the abnormality determination unit has determined an answer abnormality, the fact that the response delay determination unit has determined an answer delay, and the fact that the code error detection unit has detected an code error in the downlink communication information.

11. The in-vehicle electronic control apparatus, having a monitoring control circuit, according to claim 10,
wherein the monitoring control circuit unit includes an auxiliary microprocessor, and an auxiliary non-volatile program memory and an auxiliary RAM memory that collaborate with the auxiliary microprocessor;
wherein the auxiliary non-volatile program memory includes a control program corresponding to the abnormality determination unit, the response delay determination unit, the code error determination unit for the downlink communication information, and the reset processing unit, and stores correct-solution information for the question information; and
wherein the result of the monitoring and tallying is written in the auxiliary RAM memory.

12. The in-vehicle electronic control apparatus, having a monitoring control circuit, according to claim 1,
wherein the downlink communication information includes the first tag information, and the uplink communication information includes the second tag information;
wherein the program memory is provided with a control program corresponding to a tag abnormality determination unit;
wherein the first tag information is numerical data that is determined by the main control circuit unit and whose content changes each time the communication permission signal is generated, and the second tag information is numerical data, equal to the first tag information, that, in the next transmission, is returned as the second tag information by the monitoring control circuit unit that has received the first tag information; and
wherein the tag abnormality determination unit is a counter-monitoring unit in which the main control circuit unit determines whether or not the second tag information that is currently received from the monitoring control circuit unit and the immediately previous first tag information that has been transmitted by the main control circuit unit coincide with each other, and in the case where the tag information items do not coincide with each other, or in the case where the second tag information that coincides with the immediately previous first tag information is not obtained within a predetermined time, it is determined that an abnormality exists in the monitoring control circuit unit.

13. The in-vehicle electronic control apparatus, having a monitoring control circuit, according to claim 12,
wherein the program memory is further provided with a control program corresponding to an erroneous-answer transmission unit and a tallied information monitoring unit;
wherein the uplink communication information includes tallied information obtained through abnormality-monitoring by the monitoring control circuit unit;
wherein the erroneous-answer transmission unit is a unit that intentionally transmits erroneous-solution information, as the answer information for the question information;
wherein the intentional transmission of an erroneous answer is performed at the timing when there exist some margins for the tallied value in the abnormality monitoring and the reset processing unit in the monitoring control circuit unit is not caused to output a reset output by only a one-time transmission of the erroneous-answer; and
wherein the tallied information monitoring unit is a unit in which, by monitoring the tallied information, the main control circuit unit counter-monitors whether or not the monitoring control circuit unit normally operates.

14. The in-vehicle electronic control apparatus, having a monitoring control circuit, according to claim 13,
wherein the program memory further includes a control program corresponding to the code error detection unit or a stored-information abnormality determination unit and the reset processing unit;
wherein the code error detection unit detects an intrusion of bit information or a loss of bit information in the reception data of the uplink communication information, by use of a code check unit exemplified by the sum check or the CRC check;
wherein the storage state of setting information and output information that have been received and stored, as part of the downlink communication information, by the monitoring control circuit unit and the acknowledgement information that has been received, as part of the uplink communication information, by the main control circuit unit are compared, in the main control circuit unit, by the stored-information abnormality determination unit so that whether or not an abnormality exists is determined; and
wherein the reset processing unit initializes and restarts the monitoring control circuit unit, in response to the result of counter-monitoring and tallying of at least one of the fact that the code error detection unit has detected a code error in the uplink communication information, the fact that the stored-information abnormality determination unit has detected an abnormality in the stored information, the fact that the tag abnormality determination unit has determined that the tag information items do not coincide with each other delayed, and the fact that the tallied information obtained through the abnormality monitoring by the tallied information monitoring unit has been abnormal.

* * * * *